United States Patent
Xu et al.

(10) Patent No.: US 12,457,623 B2
(45) Date of Patent: Oct. 28, 2025

(54) RESOURCE BLOCK SET ALLOCATION FOR SUBBAND FULL DUPLEX OPERATION

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/997,918

(22) PCT Filed: Jun. 22, 2020

(86) PCT No.: PCT/CN2020/097523
§ 371 (c)(1),
(2) Date: Nov. 3, 2022

(87) PCT Pub. No.: WO2021/258263
PCT Pub. Date: Dec. 30, 2021

(65) Prior Publication Data
US 2023/0354362 A1    Nov. 2, 2023

(51) Int. Cl.
*H04L 27/26* (2006.01)
*H04W 72/1263* (2023.01)
*H04W 72/232* (2023.01)

(52) U.S. Cl.
CPC ....... *H04W 72/232* (2023.01); *H04L 27/2605* (2013.01); *H04W 72/1263* (2013.01)

(58) Field of Classification Search
CPC ........... H04W 72/1263; H04W 72/044; H04W 72/232; H04W 72/23; H04L 5/0053; H04L 27/2605; H04L 5/001
See application file for complete search history.

(56) References Cited

U.S. PATENT DOCUMENTS

2018/0279289 A1   9/2018  Islam et al.
2019/0159238 A1*  5/2019  Kim ............... H04L 1/1812
(Continued)

FOREIGN PATENT DOCUMENTS

| WO | WO-2017095467 A1 | 6/2017 |
| WO | WO-2018106380 A1 | 6/2018 |
| WO | WO-2020072978 A1 | 4/2020 |

OTHER PUBLICATIONS

International Search Report and Written Opinion—PCT/CN2020/097523—ISA/EPO—Mar. 12, 2021.
(Continued)

*Primary Examiner* — Andrew Lee
(74) *Attorney, Agent, or Firm* — Holland & Hart LLP/Qualcomm

(57) ABSTRACT

Methods, systems, and devices for wireless communications are described. The method may include identifying, for the UE, a configuration of a set of resource block sets of a radio frequency spectrum band, receiving, from a base station, a downlink control information message indicating, for each resource block set of the set of resource block sets, a communication direction for the resource block set, and communicating with the base station using one or more resource block sets of the set of resource block sets according to one or more communication directions indicated by the received downlink control information message, the one or more communication directions corresponding to respective ones of the one or more resource block sets.

20 Claims, 18 Drawing Sheets

(56) References Cited

U.S. PATENT DOCUMENTS

| | | | |
|---|---|---|---|
| 2020/0052825 A1 | 2/2020 | Sarkis et al. | |
| 2020/0076559 A1* | 3/2020 | Yoshimura | H04L 5/001 |
| 2020/0112484 A1 | 4/2020 | Sun et al. | |
| 2020/0272744 A1* | 8/2020 | Kaushik | G06F 21/602 |
| 2021/0196028 A1* | 7/2021 | Yang | A47G 1/04 |
| 2021/0235430 A1* | 7/2021 | Liu | H04W 4/00 |
| 2021/0288852 A1* | 9/2021 | Jia | H04W 72/0453 |
| 2022/0304057 A1* | 9/2022 | Liu | H04W 72/23 |
| 2022/0407663 A1* | 12/2022 | Tooher | H04L 5/0098 |
| 2023/0100816 A1* | 3/2023 | Tijoriwala | H04W 72/23 370/330 |
| 2023/0140428 A1* | 5/2023 | Yoshimura | H04W 72/0446 370/329 |
| 2024/0064806 A1* | 2/2024 | Fu | H04W 72/1268 |

OTHER PUBLICATIONS

Supplementary European Search Report—EP20942165—Search Authority—The Hague—Jan. 3, 2024.

* cited by examiner

RESOURCE BLOCK SET ALLOCATION FOR SUBBAND FULL DUPLEX OPERATION

CROSS REFERENCE

The present Application is a 371 national stage filing of International PCT Application No. PCT/CN2020/097523 by XU et al. entitled "RESOURCE BLOCK SET ALLOCATION FOR SUBBAND FULL DUPLEX OPERATION," filed Jun. 22, 2020, which is assigned to the assignee hereof, and which is expressly incorporated by reference in its entirety herein.

FIELD OF TECHNOLOGY

The following relates generally to wireless communications and more specifically to resource block set allocation for subband full duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications may be used in bandwidths in licensed and unlicensed radio frequency spectrum bands. The bandwidth may be divided into multiple resource block (RB) sets. These RB sets may use guard bands to reduce interference when an UL RB set is adjacent a DL RB set, or when a RB set for a one UE is adjacent another RB set for another UE. Efficient means of signaling RB set configurations and guard band configurations for the RB sets are desired.

SUMMARY

The described techniques relate to improved methods, systems, devices, and apparatuses that support resource block set allocation for subband full duplex operation. Generally, the described techniques provide for a base station configuring and generating a configuration of multiple resource block sets of a radio frequency spectrum band. The base station may communicate one or more aspects of the configuration to a user equipment (UE). The base station may transmit a downlink control information message to the UE that indicates, for each resource block set of the multiple resource block sets, a communication direction for the resource block set. In some cases, the UE may communicate with the base station using one or more resource block sets of the multiple resource block sets according to one or more communication directions indicated by the received downlink control information message. The one or more communication directions may correspond to respective resource block sets of the multiple resource block sets.

A method of wireless communications at a UE is described. The method may include identifying, for the UE, a configuration of a set of resource block sets of a radio frequency spectrum band, receiving, from a base station, a downlink control information message indicating, for each resource block set of the set of resource block sets, a communication direction for the resource block set, and communicating with the base station using one or more resource block sets of the set of resource block sets according to one or more communication directions indicated by the received downlink control information message, the one or more communication directions corresponding to respective ones of the one or more resource block sets.

An apparatus for wireless communications at a UE is described. The apparatus may include a processor, memory coupled with the processor, and instructions stored in the memory. The instructions may be executable by the processor to cause the apparatus to identify, for the UE, a configuration of a set of resource block sets of a radio frequency spectrum band, receive, from a base station, a downlink control information message indicating, for each resource block set of the set of resource block sets, a communication direction for the resource block set, and communicate with the base station using one or more resource block sets of the set of resource block sets according to one or more communication directions indicated by the received downlink control information message, the one or more communication directions corresponding to respective ones of the one or more resource block sets.

Another apparatus for wireless communications at a UE is described. The apparatus may include means for identifying, for the UE, a configuration of a set of resource block sets of a radio frequency spectrum band, receiving, from a base station, a downlink control information message indicating, for each resource block set of the set of resource block sets, a communication direction for the resource block set, and communicating with the base station using one or more resource block sets of the set of resource block sets according to one or more communication directions indicated by the received downlink control information message, the one or more communication directions corresponding to respective ones of the one or more resource block sets.

A non-transitory computer-readable medium storing code for wireless communications at a UE is described. The code may include instructions executable by a processor to identify, for the UE, a configuration of a set of resource block sets of a radio frequency spectrum band, receive, from a base station, a downlink control information message indicating, for each resource block set of the set of resource block sets, a communication direction for the resource block set, and communicate with the base station using one or more resource block sets of the set of resource block sets according to one or more communication directions indicated by the received downlink control information message, the one or more communication directions corresponding to respective ones of the one or more resource block sets.

Some examples of the method, apparatuses, and non-transitory computer-readable medium described herein may further include operations, features, means, or instructions for determining, for each resource block set of the set of resource block sets, that the resource block set may be associated with an uplink scheduling grant or a downlink scheduling assignment based on the received downlink control information.

Some examples of the method, apparatuses, and non-transitory computer-readable medium described herein may further include operations, features, means, or instructions for determining, according to the received downlink control information, a configuration for one or more guard bands between the set of resource block sets.

In some examples of the method, apparatuses, and non-transitory computer-readable medium described herein, determining the configuration for the one or more guard bands may include operations, features, means, or instructions for determining, of the one or more guard bands, a frequency size of the guard band based on the received downlink control information.

In some examples of the method, apparatuses, and non-transitory computer-readable medium described herein, the frequency size of an uplink guard band of the one or more guard bands differs in size from the frequency size of a downlink guard band of the one or more guard bands.

In some examples of the method, apparatuses, and non-transitory computer-readable medium described herein, indicating the communication direction for each resource block set of the set of resource block sets further may include operations, features, means, or instructions for receiving, in the downlink control information message, a first bitmap indicating the communication direction for the resource block set.

Some examples of the method, apparatuses, and non-transitory computer-readable medium described herein may further include operations, features, means, or instructions for determining a number of guard bands based on a number of bits in the first bitmap, and determining a number of resource block sets in the set of resource block sets based on the number of bits in the first bitmap or the number of guard bands.

Some examples of the method, apparatuses, and non-transitory computer-readable medium described herein may further include operations, features, means, or instructions for receiving, in the downlink control information message, an indication of available resource block sets of the set of resource block sets.

Some examples of the method, apparatuses, and non-transitory computer-readable medium described herein may further include operations, features, means, or instructions for communicating with the base station using the one or more resource block sets of the set of resource block sets according to the one or more communication directions indicated by the received downlink control information and the one or more resource block sets indicated as the available resource block sets by the received downlink control information message.

In some examples of the method, apparatuses, and non-transitory computer-readable medium described herein, the indication of the available resource block sets may be indicated in a second bitmap of the downlink control information message.

In some examples of the method, apparatuses, and non-transitory computer-readable medium described herein, the second bitmap may be received in a channel occupation time system information that may be in the downlink control information message.

Some examples of the method, apparatuses, and non-transitory computer-readable medium described herein may further include operations, features, means, or instructions for identifying that the radio frequency spectrum band may be a shared radio frequency spectrum band, and determining, for each resource block set of the set of resource block sets, that the resource block set may be available or unavailable based on the received indication.

In some examples of the method, apparatuses, and non-transitory computer-readable medium described herein, each resource block set of the set of resource block sets may be included within a listen before talk bandwidth.

In some examples of the method, apparatuses, and non-transitory computer-readable medium described herein, each listen before talk bandwidth may be a bandwidth part.

A method of wireless communications at a base station is described. The method may include determining a configuration of a set of resource block sets of a radio frequency spectrum band, transmitting, to a UE, a downlink control information message indicating, for each resource block set of the set of resource block sets, a communication direction for the resource block set, and communicating with the UE using one or more resource block sets of the set of resource block sets according to one or more communication directions indicated by the received downlink control information message, the one or more communication directions corresponding to respective ones of the one or more resource block sets.

An apparatus for wireless communications at a base station is described. The apparatus may include a processor, memory coupled with the processor, and instructions stored in the memory. The instructions may be executable by the processor to cause the apparatus to determine a configuration of a set of resource block sets of a radio frequency spectrum band, transmit, to a UE, a downlink control information message indicating, for each resource block set of the set of resource block sets, a communication direction for the resource block set, and communicate with the UE using one or more resource block sets of the set of resource block sets according to one or more communication directions indicated by the received downlink control information message, the one or more communication directions corresponding to respective ones of the one or more resource block sets.

Another apparatus for wireless communications at a base station is described. The apparatus may include means for determining a configuration of a set of resource block sets of a radio frequency spectrum band, transmitting, to a UE, a downlink control information message indicating, for each resource block set of the set of resource block sets, a communication direction for the resource block set, and communicating with the UE using one or more resource block sets of the set of resource block sets according to one or more communication directions indicated by the received downlink control information message, the one or more communication directions corresponding to respective ones of the one or more resource block sets.

A non-transitory computer-readable medium storing code for wireless communications at a base station is described. The code may include instructions executable by a processor to determine a configuration of a set of resource block sets of a radio frequency spectrum band, transmit, to a UE, a downlink control information message indicating, for each resource block set of the set of resource block sets, a communication direction for the resource block set, and communicate with the UE using one or more resource block sets of the set of resource block sets according to one or more communication directions indicated by the received downlink control information message, the one or more communication directions corresponding to respective ones of the one or more resource block sets.

Some examples of the method, apparatuses, and non-transitory computer-readable medium described herein, for each resource block set of the set of resource block sets, the resource block set may be associated with an uplink scheduling grant or a downlink scheduling assignment as indicated in the transmitted downlink control information.

Some examples of the method, apparatuses, and non-transitory computer-readable medium described herein may further include operations, features, means, or instructions for generating, as indicated in the transmitted downlink control information, a configuration for one or more guard bands between the set of resource block sets.

In some examples of the method, apparatuses, and non-transitory computer-readable medium described herein, determining the configuration for the one or more guard bands may include operations, features, means, or instructions for configuring, of the one or more guard bands, a frequency size of the guard band based on the transmitted downlink control information.

In some examples of the method, apparatuses, and non-transitory computer-readable medium described herein, the frequency size of an uplink guard band of the one or more guard bands differs in size from the frequency size of a downlink guard band of the one or more guard bands.

In some examples of the method, apparatuses, and non-transitory computer-readable medium described herein, indicating the communication direction for each resource block set of the set of resource block sets further may include operations, features, means, or instructions for transmitting, in the downlink control information message, a first bitmap indicating the communication direction for the resource block set.

Some examples of the method, apparatuses, and non-transitory computer-readable medium described herein may further include operations, features, means, or instructions for configuring a quantity of bits in the first bitmap to indicate a quantity of guard bands between the set of resource block sets, where the quantity of bits in the first bitmap or the quantity of guard bands, or both, indicate a quantity of resource block sets in the set of resource block sets.

Some examples of the method, apparatuses, and non-transitory computer-readable medium described herein may further include operations, features, means, or instructions for transmitting, in the downlink control information message, an indication of available resource block sets of the set of resource block sets.

Some examples of the method, apparatuses, and non-transitory computer-readable medium described herein may further include operations, features, means, or instructions for communicating with the UE using the one or more resource block sets of the set of resource block sets according to the one or more communication directions indicated by the transmitted downlink control information and the one or more resource block sets indicated as the available resource block sets by the transmitted downlink control information message.

In some examples of the method, apparatuses, and non-transitory computer-readable medium described herein, the indication of the available resource block sets may be indicated in a second bitmap of the downlink control information message.

Some examples of the method, apparatuses, and non-transitory computer-readable medium described herein may further include operations, features, means, or instructions for transmitting the second bitmap in a channel occupation time system information that may be in the downlink control information message.

Some examples of the method, apparatuses, and non-transitory computer-readable medium described herein may further include operations, features, means, or instructions for identifying that the radio frequency spectrum band may be a shared radio frequency spectrum band, and determining, for each resource block set of the set of resource block sets, that the resource block set may be available or unavailable based on the transmitted indication.

In some examples of the method, apparatuses, and non-transitory computer-readable medium described herein, each resource block set of the set of resource block sets may be included within a listen before talk bandwidth.

In some examples of the method, apparatuses, and non-transitory computer-readable medium described herein, each listen before talk bandwidth may be a bandwidth part.

DETAILED DESCRIPTION

Figure 1:
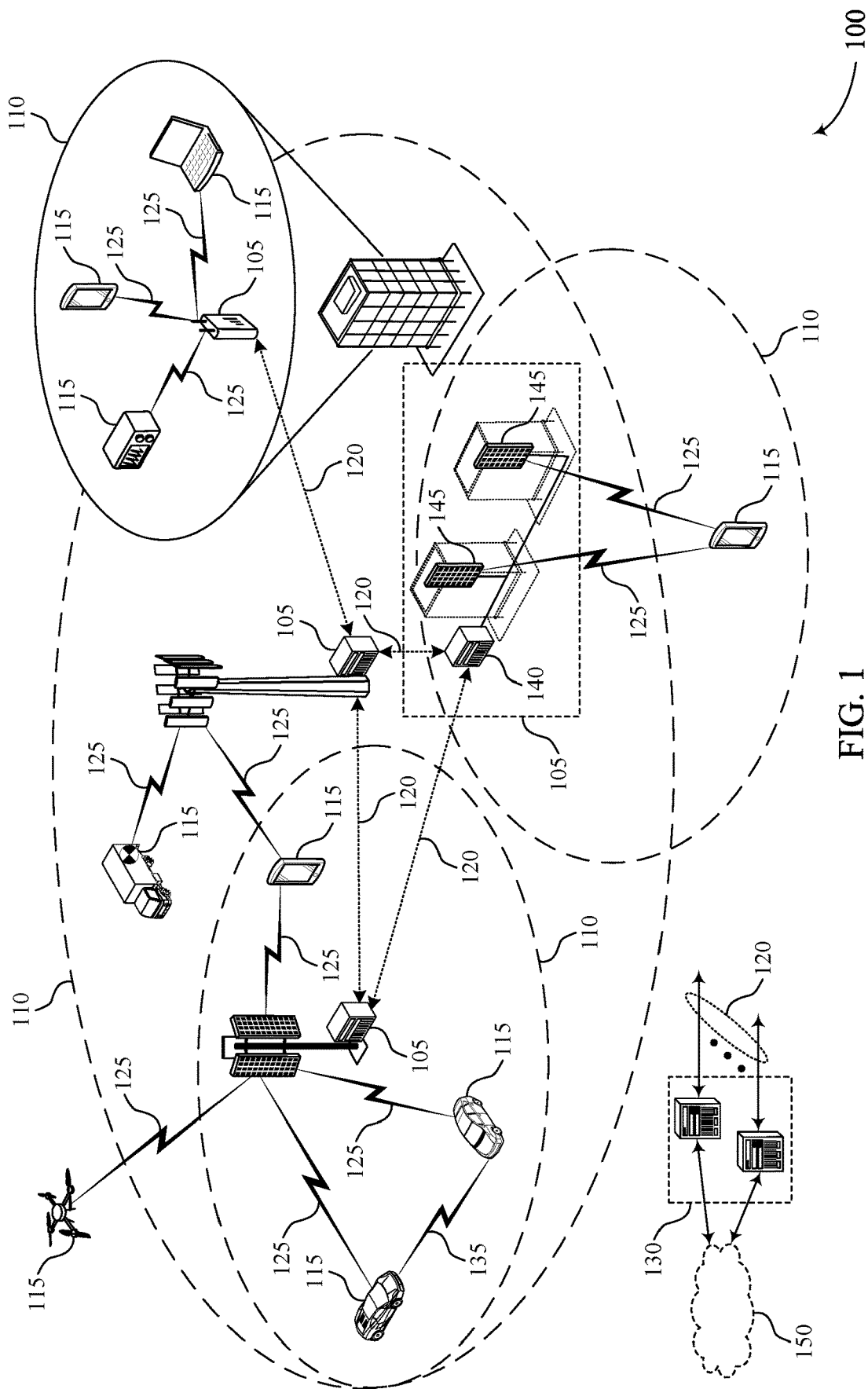
FIG. 1 illustrates an example of a system for wireless communications that supports resource block set allocation for subband full duplex operation in accordance with aspects of the present disclosure.

The present techniques provide improvements to resource block set allocation based on control information. The present techniques include resource block set allocation for subband full duplex operation. In some examples, full duplex operation may be used in bandwidths in licensed (e.g., new radio (NR)) and unlicensed (e.g., NR unlicensed (NR-U)) radio frequency spectrum bands. In some cases, the bandwidth may be divided into multiple resource block (RB) sets. For full duplex operation, the resource block sets may be used and configured for a time period as uplink (UL) or downlink (DL). These resource block sets may also use guard bands to reduce interference when an UL resource block set is adjacent a DL resource block set. Moreover, for unlicensed bandwidths, only a subset of the resource block sets of the bandwidth may be active at a time. The present techniques provide efficient means of signaling resource block set configurations, including whether a resource block set is UL or DL, whether a resource block set is available, and guard band configurations for the resource block sets. The present techniques provide configurations for unlicensed bandwidths (e.g., configurations where only a subset of the resource block sets may be available).

The present techniques include providing information regarding aspects of resource block sets based on considerations of full duplex operation in both licensed bands (e.g., for NR) and unlicensed bands (e.g., for NR-U). In some cases, the present techniques include a base station providing a UE with an indication of communication direction of resource block sets (e.g., UL or DL). In some cases, the present techniques include a base station providing a UE with an indication of resource block set availability (e.g., a first resource block set is available, a second resource block set is unavailable, etc.)

In some examples, the present techniques introduce a direction bitmap (e.g., transmitted in DCI format 2_0 for example). In some examples, the direction bitmap may be based on a bitmap used for NR-U used to indicate sharing of channel occupancy time per LBT subband. However, the direction bitmap may be configured to indicate which resource block set is DL and which resource block set is UL (e.g., 0 for UL and 1 for DL, or vice versa). In some cases, when two adjacent resource block sets are DL, the guard band in-between is of a DL guard band type. If two adjacent resource block sets are UL, the guard band in-between is of a UL guard band type. The DL guard band may be configured to be a different size in frequency than the UL guard band. When one resource block set is UL and the next one is DL, the guard bands follow UL/DL configuration respectively. In some cases, knowledge of the resource block sets may be applied to scheduled and configured transmissions between the UE and the base station (e.g., as in NR-U), but with the present techniques the bits of the bitmap are treated with the new interpretation.

In some examples, a second bitmap and the first bitmap may be included in signaling (e.g., included in DCI format 2_0). The first bitmap may indicate communication direction for resource block sets (e.g., which resource block set is DL and which resource block set is UL, etc.) and the second bitmap may indicate resource block set availability (e.g., which resource block set is available for transmission, which may be based on LBT results). If two adjacent resource block sets are DL, the guard band in-between may be of a DL type. If two adjacent resource block sets are UL, the guard band in-between may be of a UL type, which may be a different size than the DL type. If one resource block set is DL and the next one is UL, the guard bands follow UL/DL configuration respectively for full duplex. When one resource block set is not available for transmission, the available adjacent resource block sets with same direction (UL or DL) will follow the UL/DL guard band for NR-U. Thus, the present techniques may provide four types of resource block sets based on licensed bands and unlicensed bands. For DL resource block sets and UL resource block sets for unlicensed band follow the current definition in NR-U. For DL resource block sets for full duplex band and UL resource block sets for full duplex band follow the new definition associated with the first bitmap.

Aspects of the disclosure are initially described in the context of wireless communications systems. Aspects of the disclosure are further described in the context of wireless communications sub-systems. Aspects of the disclosure are initially described in the context of wireless communications environments (e.g., an environment of a wireless communications system). Aspects of the disclosure are further illustrated by and described with reference to apparatus diagrams, system diagrams, and flowcharts that relate to resource block set allocation for subband full duplex operation.

FIG. 1 illustrates an example of a wireless communications system 100 that supports resource block set allocation for subband full duplex operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a UE 115 of FIG. 1 may communicate with a base station 105 of FIG. 1 based on a configuration (e.g., resource block set configuration). In some examples, the base station 105 may determine a configuration of multiple resource block sets of a radio frequency spectrum band. In some cases, the radio frequency spectrum band may be a licensed radio frequency spectrum band or an unlicensed radio frequency spectrum band. In some examples, the base station 105 may transmit, to the UE 115, a downlink control information message that indicates a communication direction for each resource block set of the multiple resource block sets. In some cases, the UE 115 may receive the downlink control information message and determine one or more aspects of the configuration of the multiple resource block sets of a radio frequency spectrum band based on information indicated in the downlink control information message. In some cases, the downlink control information message may indicate one or more communication directions (e.g., uplink (UL), downlink (DL)) associated with the multiple resource block sets or may indicate available resource block sets and unavailable resource block sets of the multiple resource block sets, or may indicate both. In some cases, the UE 115 may communicate with the base station 105 using one or more resource block sets of the multiple resource block sets according to the information indicated in the downlink control information message.

Figure 2:
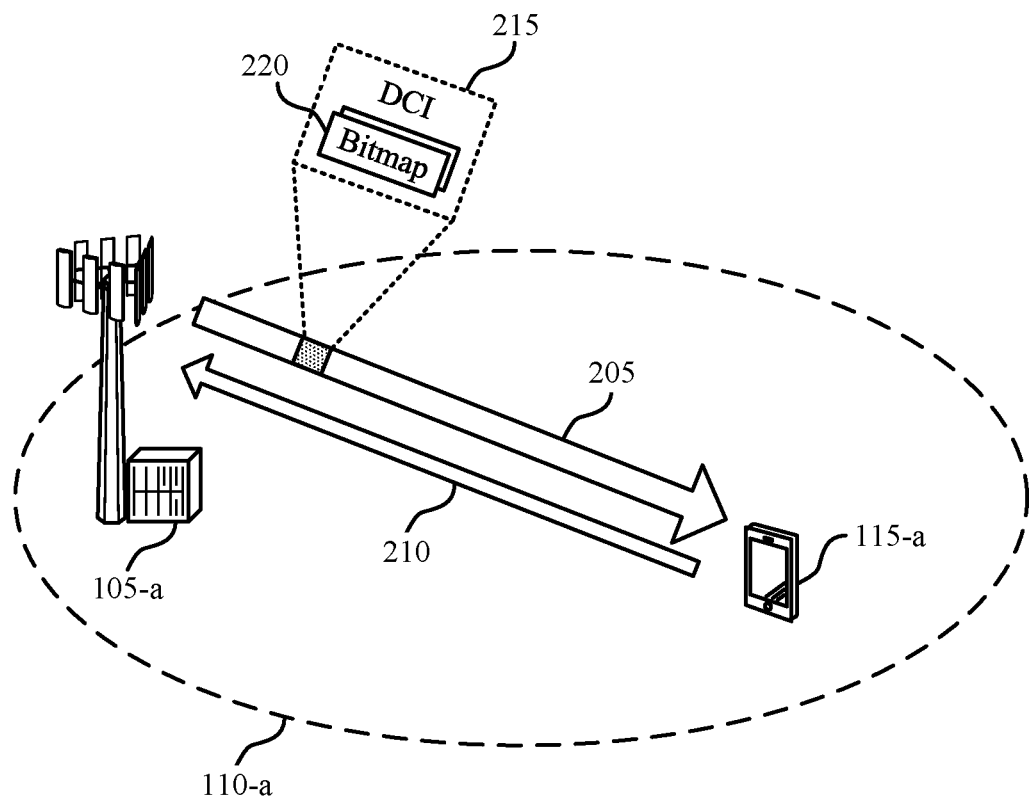
FIG. 2 illustrates an example of a wireless communication subsystem that supports resource block set allocation for subband full duplex operation in accordance with aspects of the present disclosure.

FIG. 2 illustrates an example of a wireless communication subsystem 200 that supports resource block set allocation for subband full duplex operation in accordance with aspects of the present disclosure. In some examples, wireless communication subsystem 200 may implement aspects of wireless communication system 100. In some cases, the radio frequency spectrum band of wireless communications subsystem 200 may be or operate in a licensed radio frequency spectrum band. Wireless communications subsystem 200 may include UE 115-*a* and base station 105-*a*, which may be examples of a UE 115 or a base station 105, as described above with reference to FIG. 1. Wireless communications subsystem 200 may also include downlink 205 and uplink 210. Base station 105-*a* may use downlink 205 to convey control and data information to UE 115-*a*. And UE 115-*a* may use uplink 210 to convey control and data information to base station 105-*a*. In some cases, downlink 205 uses different time and/or frequency resources than uplink 210.

In the illustrated example, base station 105-*a* may transmit downlink control information (DCI) 215 to UE 115-*a* over downlink 205. As shown, DCI 215 may include bitmap 220 (e.g., one or more bitmaps). In some cases, DCI 215 may include two or more bitmaps that include bitmap 220. In some cases, bitmap 220 may include a direction bitmap that indicates a communication direction for each resource block set of multiple resource block sets. In some cases, bitmap 220 may include an availability bitmap that indicates which resource blocks sets of the multiple resource block sets are available and which resource blocks sets of the multiple resource block sets are unavailable.

In some cases, DCI 215 indicates a slot format. In some examples, DCI 215 may be scrambled by a slot format indication radio network temporary identifier (SFI-RNTI). In some examples, UE 115-*a* may communicate with a base station 105-*a* according to a configuration associated with wireless communications subsystem 200 (e.g., resource block set configuration). In some cases, base station 105-*a* may configure or select the configuration and communicate the configuration to UE 115-*a*. In some examples, base station 105-*a* may indicate the configuration to UE 115-*a* in DCI 215.

In some examples, the base station 105-*a* may determine a configuration for each resource block set of multiple resource block sets of a radio frequency spectrum band. In some cases, the configuration may indicate a communication direction for each resource block set of the multiple resource block sets. The configuration may indicate a first resource block set of the of the multiple resource block sets has an uplink communication direction and the configuration may indicate that a second resource block set of the of the multiple resource block sets has a downlink communication direction, and so on. In some examples, bitmap 220 may indicate uplink/downlink communication direction of the resource block sets. In some examples, a binary 0 in bitmap 220 may indicate an uplink communication direction of a resource block set and binary 1 in bitmap 220 may indicate a downlink communication direction of a resource block set. In some examples, a binary 1 in bitmap 220 may indicate an uplink communication direction of a resource block set and binary 0 in bitmap 220 may indicate a downlink communication direction of a resource block set.

In some examples, the configuration may indicate which resource blocks sets of the multiple resource block sets are available and which resource blocks sets of the multiple resource block sets are unavailable. The configuration may indicate a first resource block set of the of the multiple resource block sets is available and that a second resource block set of the of the multiple resource block sets is unavailable, and so on. In some examples, bitmap 220 may indicate availability of the resource block sets. In some examples, a binary 0 in bitmap 220 may indicate a resource block set is available and binary 1 in bitmap 220 may indicate a resource block set is unavailable. In some examples, a binary 1 in bitmap 220 may indicate a resource block set is available and binary 0 in bitmap 220 may indicate a resource block set is unavailable.

In some cases, the UE 115-*a* may receive DCI 215 and determine one or more aspects of the configuration of the multiple resource block sets based on information indicated in DCI 215. In some cases, DCI 215 may indicate the communication directions of the multiple resource block sets (e.g., the communication directions of one or more resource block sets of the multiple resource block sets). In some cases, DCI 215 may indicate resource block set availability (e.g., which resource blocks sets of the multiple resource block sets are available or which resource blocks sets of the multiple resource block sets are unavailable, or both). In some cases, DCI 215 may indicate both the communication directions and the resource block set availability associated with the multiple resource block sets.

In some cases, the UE 115-*a* may communicate with the base station 105-*a* based on the configuration associated with wireless communications subsystem 200 (e.g., resource block set configuration). In some examples, UE 115-*a* may communicate with the base station 105-*a* based on the information indicated in DCI 215. In some instances, UE 115-*a* may communicate with the base station 105-*a* based on using one or more resource block sets of the multiple resource block sets according to the information indicated in the DCI 215. In some instances, UE 115-*a* may communicate with the base station 105-*a* based on the one or more communication directions of the multiple resource block sets indicated in DCI 215. In some instances, UE 115-*a* may communicate with the base station 105-*a* based on the resource block set availability of the multiple resource block sets indicated in DCI 215. In some instances, UE 115-*a* may communicate with the base station 105-*a* based on the one or more communication directions and the resource block set availability of the multiple resource block sets indicated in DCI 215.

Figure 3:
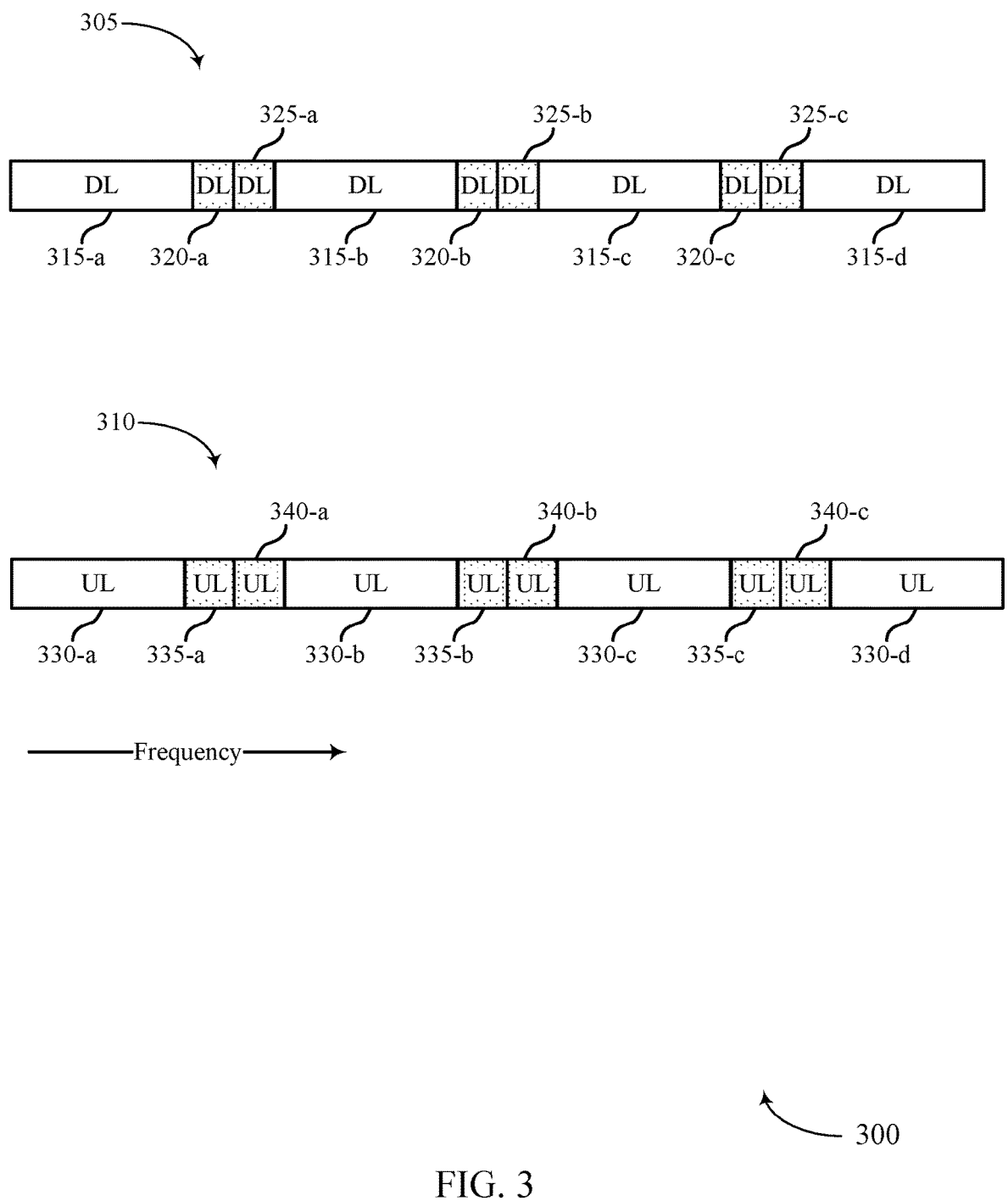
FIG. 3 illustrates an example of an environment that supports resource block set allocation for subband full duplex operation in accordance with aspects of the present disclosure.

FIG. 3 illustrates an example of an environment 300 that supports resource block set allocation for subband full duplex operation in accordance with aspects of the present disclosure. In some examples, environment 300 may implement aspects of wireless communication system 100. In some cases, environment 300 depicts UL/DL guard band configurations for environments operating in a licensed radio frequency spectrum band. In some cases, a base station (e.g., a base station 105 of FIG. 1 or FIG. 2) may signal the UL/DL guard band configurations to a UE (e.g., a UE 115 of FIG. 1 or FIG. 2) that defines aspects of resource block sets and intra-cell guard band configurations (e.g., frequency sizes or bandwidth, etc.).

In the illustrated example, environment 300 may include guard band configuration 305 and guard band configuration 310 for licensed radio frequency spectrum bands. Guard band configuration 305 depicts a configuration of DL resource block sets and DL guard bands in licensed radio frequency spectrum bands. Guard band configuration 310 depicts a configuration of UL resource block sets and UL guard bands in licensed radio frequency spectrum bands. In some examples, the radio spectrum of environment 500 may use 20 MHz as a basic channel access unit. This basic channel access unit may be referred to as an LBT bandwidth. In some cases, the available resource blocks in each LBT bandwidth may be referred to as a resource block set.

As illustrated, guard band configuration 305 may include DL resource block set 315-*a*, DL resource block set 315-*b*, DL resource block set 315-*c*, and DL resource block set 315-*d*. As shown, DL guard band 320-*a* and DL guard band 325-*a* may be situated between DL resource block set 315-*a* and DL resource block set 315-*b*, DL guard band 320-*b* and DL guard band 325-*b* may be situated between DL resource block set 315-*b* and DL resource block set 315-*c*, and DL guard band 320-*c* and DL guard band 325-*c* may be situated between DL resource block set 315-*c* and DL resource block set 315-*d*.

As illustrated, guard band configuration 310 may include UL resource block set 330-*a*, UL resource block set 330-*b*, UL resource block set 330-*c*, and UL resource block set 330-*d*. As shown, UL guard band 335-*a* and UL guard band 340-*a* may be situated between UL resource block set 330-*a* and UL resource block set 330-*b*, UL guard band 335-*b* and UL guard band 340-*b* may be situated between UL resource block set 330-*b* and UL resource block set 330-*c*, and UL guard band 335-*c* and UL guard band 340-*c* may be situated between UL resource block set 330-*c* and UL resource block set 330-*d*.

In some examples, a DL resource block set (e.g., DL resource block set 315-*a*, etc.) may be derived from intra-cell DL guard band signaling (e.g., configuration of DL guard band 320-*a*). In some examples, a UL resource block set (e.g., UL resource block set 315-*a*, etc.) may be derived from intra-cell UL guard band signaling (e.g., configuration of UL guard band 320-*a*). In some examples, the DL guard bands may not align (e.g., align in frequency) with the UL guard bands. In some examples, the DL resource block sets or the UL resource block sets, or both, may not align with the 20 MHz basic channel access unit of an LBT bandwidth.

As shown, DL resource block set 315-*a* may be adjacent to DL guard band 320-*a*; DL resource block set 315-*b* may be adjacent to DL guard band 325-*a* and DL guard band 320-*b*; DL resource block set 315-*c* may be adjacent to DL guard band 325-*b* and DL guard band 320-*c*; DL resource block set 315-*d* may be adjacent to DL guard band 325-*c* and DL guard band 320-*d*.

As shown, UL resource block set 330-*a* may be adjacent to UL guard band 335-*a*; UL resource block set 330-*b* may be adjacent to UL guard band 340-*a* and UL guard band 335-*b*; UL resource block set 330-*c* may be adjacent to UL guard band 340-*b* and UL guard band 335-*c*; UL resource block set 330-*d* may be adjacent to UL guard band 340-*c* and UL guard band 335-*d*.

In some examples, each DL guard band may be configured to have some frequency size or bandwidth (e.g., signaled in downlink control information). In some examples, each UL guard band may be configured to have some frequency size or bandwidth (e.g., signaled in downlink control information). In some examples, the frequency size of the DL guard bands may differ from the frequency size of the UL guard band. In some cases, a guard band may have a zero frequency size or zero bandwidth when a base station is performing an all DL or no DL transmission for two or more consecutive resource block sets, or a UE is performing an all UL or no UL transmission for two or more consecutive resource block sets.

Figure 4:
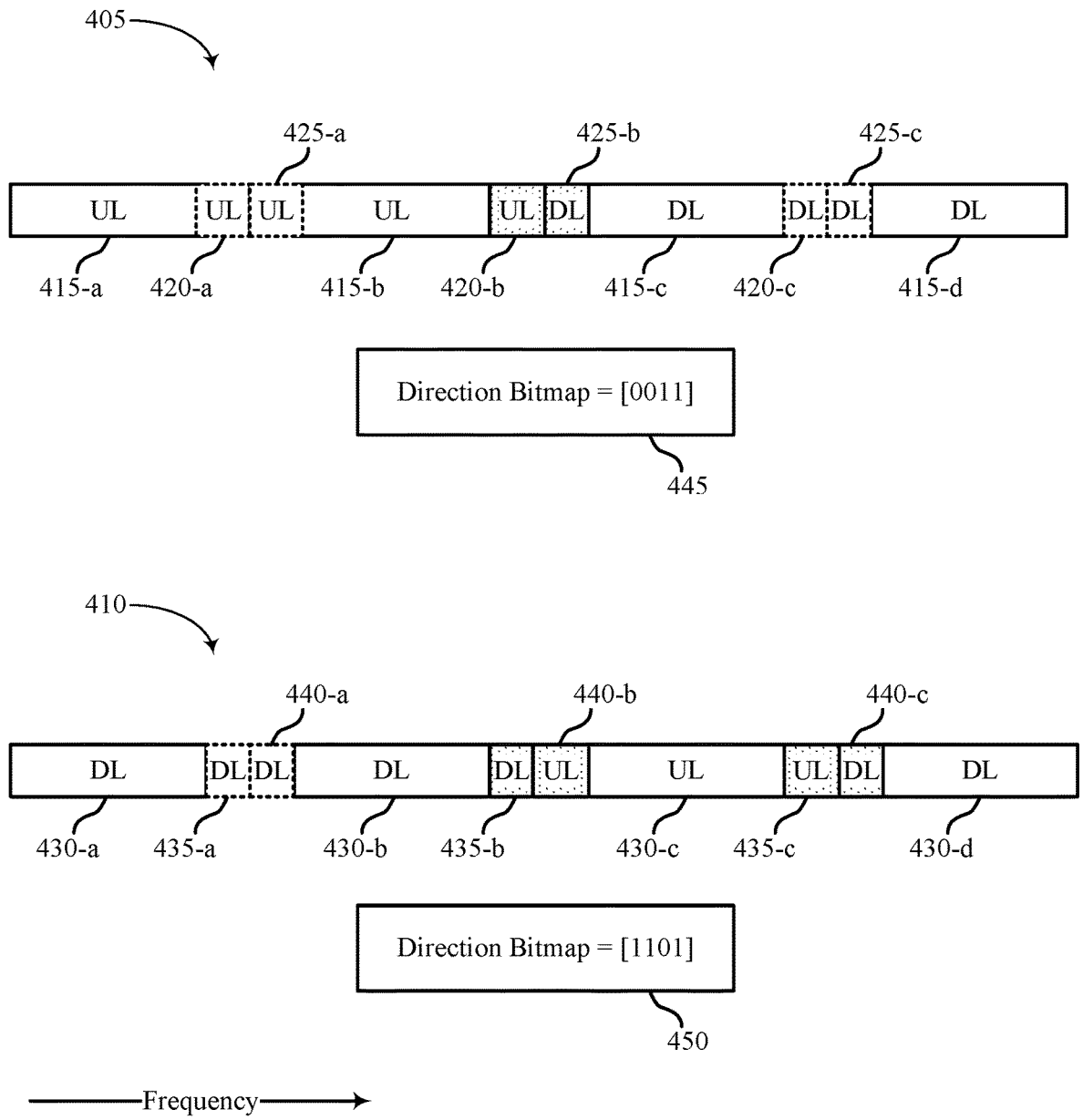
FIG. 4 illustrates an example of an environment that supports resource block set allocation for subband full duplex operation in accordance with aspects of the present disclosure.

FIG. 4 illustrates an example of an environment 400 that supports resource block set allocation for subband full duplex operation in accordance with aspects of the present disclosure. In some examples, environment 400 may implement aspects of wireless communication system 100. In the illustrated example, environment 400 may include guard band configuration 405 and guard band configuration 410 for licensed radio frequency spectrum band. Guard band configuration 405 may include multiple resource block sets. Guard band configuration 410 may include multiple resource block sets.

As illustrated, guard band configuration 405 may include UL resource block set 415-*a*, UL resource block set 415-*b*, DL resource block set 415-*c*, and DL resource block set 415-*d*. As shown, UL guard band 420-*a* and UL guard band 425-*a* may be situated between UL resource block set 415-*a* and UL resource block set 415-*b*, UL guard band 420-*b* and DL guard band 425-*b* may be situated between UL resource block set 415-*b* and DL resource block set 415-*c*, and DL guard band 420-*c* and DL guard band 425-*c* may be situated between DL resource block set 415-*c* and DL resource block set 415-*d*.

As illustrated, guard band configuration 410 may include DL resource block set 430-*a*, DL resource block set 430-*b*, UL resource block set 430-*c*, and DL resource block set 430-*d*. As shown, DL guard band 435-*a* and DL guard band 440-*a* may be situated between DL resource block set 430-*a* and DL resource block set 430-*b*, DL guard band 435-*b* and UL guard band 440-*b* may be situated between DL resource block set 430-*b* and UL resource block set 430-*c*, and UL guard band 435-*c* and DL guard band 440-*c* may be situated between UL resource block set 430-*c* and DL resource block set 430-*d*.

In some cases, the configuration of the resource block sets may be applied to scheduled and configured transmissions between a UE and a base station based on a direction bitmap. In some cases, a direction bitmap may be transmitted in a downlink control information message (e.g., DCI format 2_0). In some cases, the direction bitmap may indicate which resource block set of guard band configuration 405 or guard band configuration 410 is DL and which resource block set is UL (e.g., 0 for UL and 1 for DL). In some cases, the bitmap size (e.g., number of bits in the direction bitmap) may correspond to a number of resource block sets on a carrier.

Examples of the direction bitmap may include direction bitmap 445 and direction bitmap 450. As shown, direction bitmap 445 may be configured (e.g., by a base station) to indicate a configuration of guard band configuration 405 and direction bitmap 450 may be configured (e.g., by the base station) to indicate a configuration of guard band configuration 410.

In the illustrated example, direction bitmap 445 for the resource block sets of guard band configuration 405 may be configured with the binary sequence [0011]. In some examples, the lease significant bit of direction bitmap 445 may be associated with the lowest frequency resource block set (e.g., UL resource block set 415-*a*) or the highest frequency resource block set (e.g., DL resource block set 415-*d*).

In the illustrated example, the least significant bit "0" of direction bitmap 445 indicates UL resource block set 415-*a* is in the UL direction and that the next bit "0" indicates UL resource block set 415-*b* is also in the UL direction. Accordingly, because two adjacent resource block sets are in the same direction, a UE receiving direction bitmap 445 may determine that UL guard band 420-*a* and UL guard band 425-*a* are each configured with a zero frequency bandwidth in order to make the bandwidth of UL guard band 420-*a* and DL guard band 425-*a* available for uplink communications in addition to the available bandwidth of UL resource block set 415-*a* and UL resource block set 415-*b*. The UE receiving direction bitmap 445 may determine that UL guard band 420-*b* is configured with the configuration of a licensed UL guard band of guard band configuration 310 (e.g., DL guard band 335-*c*, etc.) based on the next resource block set being in the downlink direction (e.g., DL resource block set 415-*c*).

The next bit "1" of direction bitmap 445 indicates DL resource block set 415-*c* is in the DL direction. The UE may determine that DL guard band 420-*b* is configured with the configuration of a licensed DL guard band of guard band configuration 305 (e.g., DL guard band 325-*b*, etc.) based on the preceding resource block set being in the uplink direction (e.g., UL resource block set 415-*b*).

The most significant bit "1" indicates DL resource block set 415-*d* is in the DL direction. Accordingly, because two adjacent resource block sets are in the same direction (e.g., DL resource block set 415-*c* and DL resource block set 415-*d*), a UE receiving direction bitmap 445 may determine that DL guard band 420-*c* and DL guard band 425-*c* are each configured with a zero frequency bandwidth in order to make the bandwidth of DL guard band 420-*c* and DL guard band 425-*c* available for downlink communications in addition to the available bandwidth of DL resource block set 415-*c* and DL resource block set 415-*d*.

In the illustrated example, direction bitmap 450 for the resource block sets of guard band configuration 410 may be configured with the binary sequence [1101]. The least significant bit "1" of direction bitmap 450 indicates DL resource block set 430-*a* is in the DL direction. The next bit "1" of direction bitmap 450 indicates DL resource block set 430-*b* is also in the DL direction. Accordingly, because two adjacent resource block sets are in the same direction (e.g., DL resource block set 430-*c* and DL resource block set 430-*d*), the UE receiving direction bitmap 445 may determine that DL guard band 435-*c* and DL guard band 440-*c* are each configured with a zero frequency bandwidth in order to make the bandwidth of DL guard band 435-*c* and DL guard band 440-*c* available for downlink communications in addition to the available bandwidth of DL resource block set 430-*c* and DL resource block set 430-*d*.

The next bit "0" of direction bitmap 450 indicates UL resource block set 430-*c* is in the UL direction. Because the previous resource block set (DL resource block set 430-*b*) is in the downlink direction, the UE may determine that UL guard band 440-*b* is configured with the configuration of a licensed UL guard band of guard band configuration 305 (e.g., UL guard band 340-*b*, etc.). Because the next resource block set (DL resource block set 430-*d*) is in the downlink direction, the UE may determine that UL guard band 435-*c* is configured with the configuration of a licensed UL guard band of guard band configuration 305 (e.g., UL guard band 335-*c*, etc.)

The most significant bit "1" indicates DL resource block set 430-*d* is in the DL direction. Because the previous resource block set (UL resource block set 430-*c*) is in the uplink direction, the UE may determine that DL guard band 440-*c* is configured with the configuration of a licensed DL guard band of guard band configuration 305 (e.g., DL guard band 325-*c*, etc.).

As shown, when the communication directions of two adjacent resource block sets are DL (e.g., DL resource block set 415-*c* and DL resource block set 415-*d*), then the guard bands between are of a DL guard band type (e.g., DL guard band 420-*c* and DL guard band 425-*c*). When the communication directions of two adjacent resource block sets are UL (e.g., UL resource block set 415-*a* and UL resource block set 415-*b*), the guard bands between are of a UL guard band type (e.g., UL guard band 420-*a* and UL guard band 425-*a*).

In some examples, a DL guard band (e.g., DL guard band 425-*b*) may be configured to have a different frequency size (e.g., smaller bandwidth or larger bandwidth) than a UL guard band (e.g., UL guard band 420-*a*). When the communication direction of one resource block set is UL (e.g., UL resource block set 415-*b*) and the communication direction of the next resource block set is DL (e.g., DL resource block set 415-*c*), UL/DL transmission follows UL/DL guard band respectively (e.g., UL guard band 420-*b* and DL guard band 425-*b*). When the communication direction of a resource block set is DL (e.g., DL resource block set 415-*b*) and the communication direction of the next resource block set is UL (e.g., UL resource block set 415-*c*), DL/UL transmission follows DL/UL guard band respectively (e.g., DL guard band 420-*b* and UL guard band 425-*b*). Accordingly, a UL resource block set of a guard band configuration (e.g., UL resource block set 415-*c* of guard band configuration 410) may be derived separately from a DL resource block set of the same guard band configuration (e.g., DL resource block set 415-*d* of guard band configuration 410).

Figure 5:
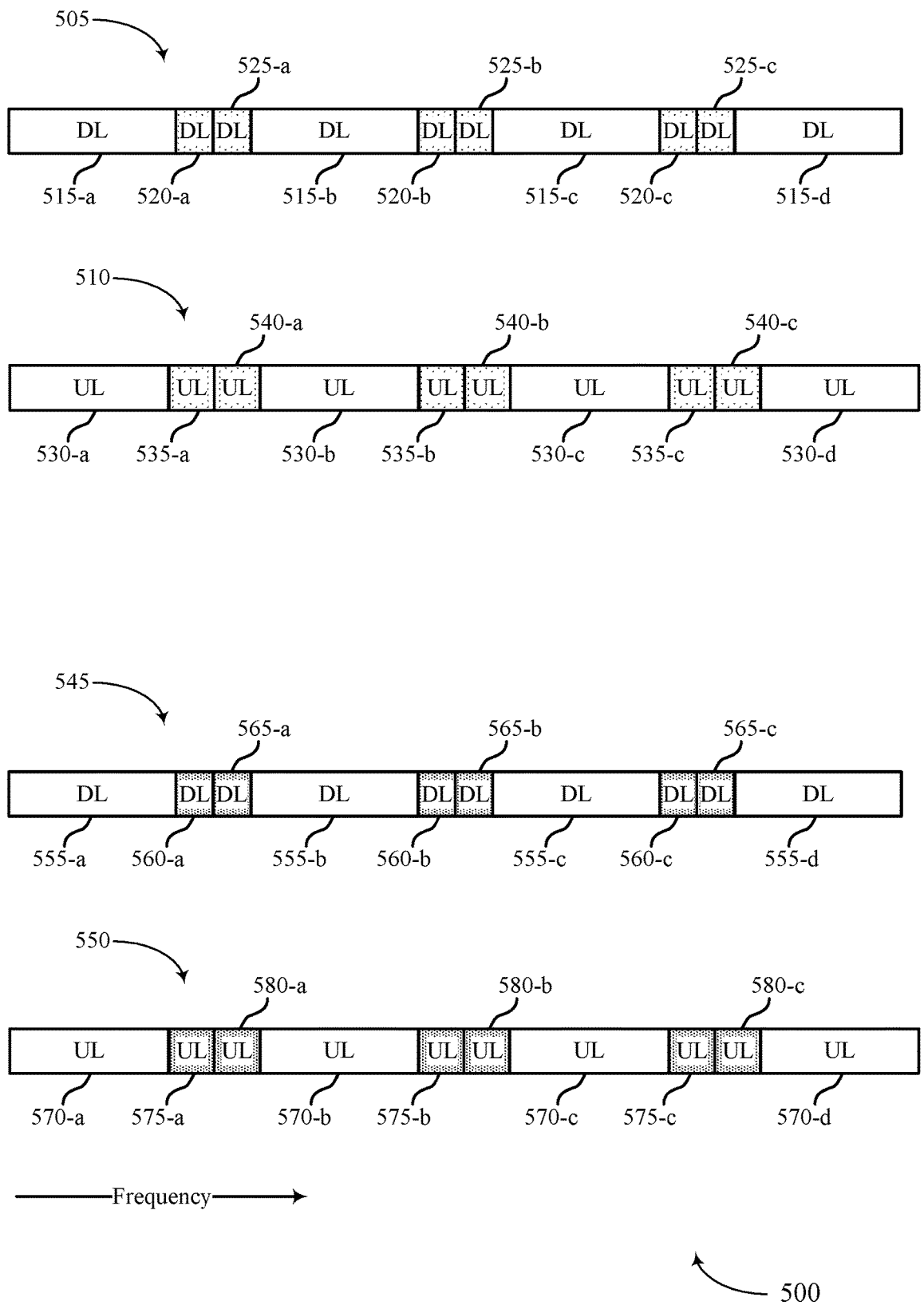
FIG. 5 illustrates an example of an environment that supports resource block set allocation for subband full duplex operation in accordance with aspects of the present disclosure.

FIG. 5 illustrates an example of an environment 500 that supports resource block set allocation for subband full duplex operation in accordance with aspects of the present disclosure. In some examples, environment 500 may implement aspects of wireless communication system 100. In some cases, environment 500 depicts UL/DL guard band configurations for an environment operating in a licensed radio frequency spectrum band or in an unlicensed radio frequency spectrum band, or both.

In the illustrated example, environment 500 may include guard band configuration 505 and guard band configuration 510 for licensed radio frequency spectrum bands. Guard band configuration 505 depicts a configuration of DL resource block sets and DL guard bands in licensed radio frequency spectrum bands. Guard band configuration 510 depicts a configuration of UL resource block sets and UL guard bands in licensed radio frequency spectrum bands. In some examples, the radio spectrum of environment 500 may use 20 MHz as a basic channel access unit (e.g., LBT bandwidth).

In the illustrated example, environment 500 may include guard band configuration 545 and guard band configuration 550 for unlicensed radio frequency spectrum bands. Guard band configuration 545 depicts a configuration of DL resource block sets and DL guard bands in unlicensed radio frequency spectrum bands. Guard band configuration 550 depicts a configuration of UL resource block sets and UL guard bands in unlicensed radio frequency spectrum bands. In some examples, the radio spectrum of environment 500 may use 20 MHz as a basic channel access unit (e.g., LBT bandwidth).

As illustrated, guard band configuration 505 may include DL resource block sets 515 (e.g., 515-*a*, 515-*b*, 515-*c*, 515-*d*), DL guard bands 520 (e.g., 520-*a*, 520-*b*, 520-*c*), and DL guard bands 525 (e.g., 525-*a*, 525-*b*, 525-*c*) for licensed radio frequency spectrum bands. As shown, DL guard bands 520 and DL guard bands 525 may be situated between DL resource block sets 515. Also as illustrated, guard band configuration 510 may include UL resource block sets 530 (e.g., 530-*a*, 530-*b*, 530-*c*, 530-*d*), UL guard bands 535 (e.g., 535-*a*, 535-*b*, 535-*c*), and UL guard bands 540 (e.g., 540-*a*, 540-*b*, 540-*c*) for licensed radio frequency spectrum bands. As shown, UL guard bands 535 and UL guard bands 540 may be situated between UL resource block sets 530.

As illustrated, guard band configuration 545 may include DL resource block sets 555 (e.g., 555-*a*, 555-*b*, 555-*c*, 555-*d*), DL guard bands 560 (e.g., 560-*a*, 560-*b*, 560-*c*), and DL guard bands 565 (e.g., 560-*a*, 560-*b*, 560-*c*) for unlicensed radio frequency spectrum bands. As shown, DL guard bands 560 and DL guard bands 565 may be situated between DL resource block sets 555. Also as illustrated, guard band configuration 550 may include UL resource block sets 570 (e.g., 570-*a*, 570-*b*, 570-*c*, 570-*d*), UL guard bands 575 (e.g., 575-*a*, 575-*b*, 575-*c*), and UL guard bands

580 (e.g., 580-*a*, 580-*b*, 580-*c*) for unlicensed radio frequency spectrum bands. As shown, UL guard bands 575 and UL guard bands 580 may be situated between UL resource block sets 570.

In some examples, each guard band of DL guard bands 520, DL guard bands 525, DL guard bands 560, and DL guard bands 565 may be configured to have some frequency size or bandwidth. In some cases, DL guard bands 520 and DL guard bands 525 for licensed radio frequency spectrum bands may have a frequency size that is the same or different from the frequency size of DL guard bands 560 and DL guard bands 565 for unlicensed radio frequency spectrum bands.

In some examples, each guard band of UL guard bands 535, UL guard bands 540, UL guard bands 575, and UL guard bands 580 may be configured to have some frequency size or bandwidth. In some cases, UL guard bands 535 and UL guard bands 540 configured for licensed radio frequency spectrum bands may have a frequency size that is the same or different from the frequency size of UL guard bands 575 and UL guard bands 580 configured for unlicensed radio frequency spectrum bands.

Figure 6:
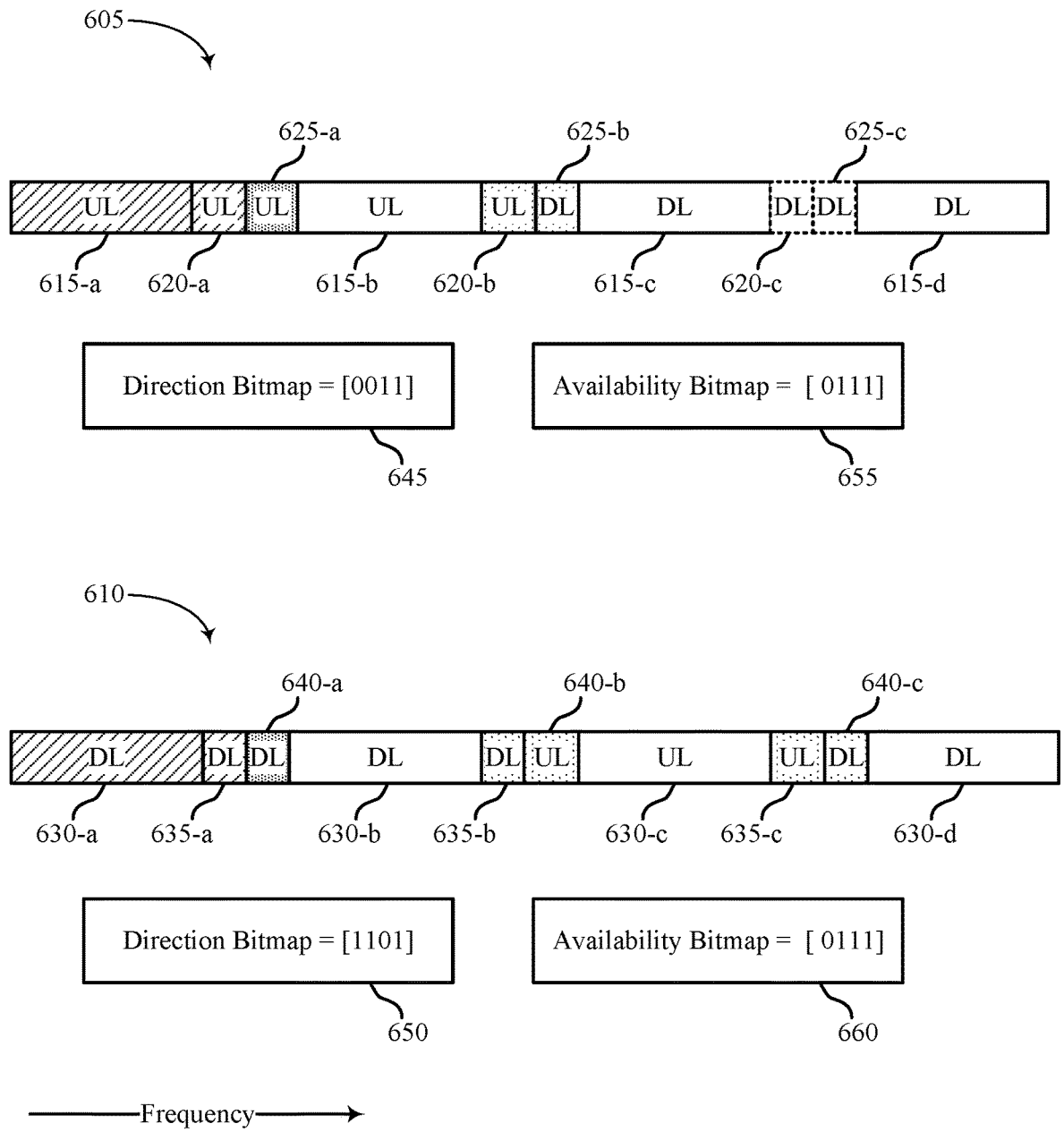
FIG. 6 illustrates an example of an environment that supports resource block set allocation for subband full duplex operation in accordance with aspects of the present disclosure.

FIG. 6 illustrates an example of an environment 600 that supports resource block set allocation for subband full duplex operation in accordance with aspects of the present disclosure. In some examples, environment 600 may implement aspects of wireless communication system 100. In some cases, environment 600 depicts UL/DL guard band configurations for an environment operating in a licensed radio frequency spectrum band or in an unlicensed radio frequency spectrum band, or both.

As illustrated, guard band configuration 605 may include UL resource block set 615-*a*, UL resource block set 615-*b*, DL resource block set 615-*c*, and DL resource block set 615-*d*. As shown, UL guard band 620-*a* and UL guard band 625-*a* may be situated between UL resource block set 615-*a* and UL resource block set 615-*b*, UL guard band 620-*b* and DL guard band 625-*b* may be situated between UL resource block set 615-*b* and DL resource block set 615-*c*, and DL guard band 620-*c* and DL guard band 625-*c* may be situated between DL resource block set 615-*c* and DL resource block set 615-*d*.

As illustrated, guard band configuration 610 may include DL resource block set 630-*a*, DL resource block set 630-*b*, UL resource block set 630-*c*, and DL resource block set 630-*d*. As shown, DL guard band 635-*a* and DL guard band 640-*a* may be situated between DL resource block set 630-*a* and DL resource block set 630-*b*, DL guard band 635-*b* and UL guard band 640-*b* may be situated between DL resource block set 630-*b* and UL resource block set 630-*c*, and UL guard band 635-*c* and DL guard band 640-*c* may be situated between UL resource block set 630-*c* and DL resource block set 630-*d*.

In some cases, the configuration of the resource block sets may be applied to scheduled and configured transmissions between a UE and a base station based on a direction bitmap. In some cases, a direction bitmap and availability map may be transmitted in a downlink control information message (e.g., DCI format 2_0). In some cases, the direction bitmap may indicate which resource block set of guard band configuration 605 or guard band configuration 610 is DL and which resource block set is UL (e.g., 0 for UL and 1 for DL). In some cases, the availability map may indicate which resource block sets of guard band configuration 605 or guard band configuration 610 are available. In some cases, the bitmap size (e.g., number of bits in the direction bitmap) may correspond to a number of resource block sets on a carrier.

In the illustrated example, direction bitmap 650 for the resource block sets of guard band configuration 610 may be configured by a base station to have the binary sequence [1101]. In the illustrated example, availability bitmap 660 for the resource block sets of guard band configuration 610 may be configured by a base station to have the binary sequence [0111].

A UE receiving direction bitmap 650 and availability bitmap 660 may determine that the first bit of direction bitmap 650 (e.g., binary 1) indicates a first resource block set (e.g., DL resource block set 630-*a*) is in the downlink direction and that a first bit of the availability bitmap 660 (e.g., binary 0) indicates the first resource block set is unavailable. Accordingly, the UE may determine that the bandwidth of DL resource block set 630-*a* and DL guard band 635-*a* is unavailable based on the first bit of availability bitmap 660 (e.g., binary 0). Based on the UL resource block set 630-*a* being unavailable, the UE may determine that DL guard band 635-*a* corresponds to an unavailable resource set and so the UE may determine that DL guard band 635-*a* is also unavailable bandwidth.

A UE receiving direction bitmap 650 and availability bitmap 660 may determine that a second bit of the direction bitmap 650 (e.g., binary 0) indicates a second resource block set (e.g., DL resource block set 630-*b*) is in the downlink direction and that the second bit of the availability bitmap 660 (e.g., binary 1) indicates the second resource block set is available. Accordingly, based on DL guard band 635-*a* corresponding to an unavailable resource block set and DL resource block set 630-*b* being available, the UE may determine that the configuration of DL guard band 640-*a* is configured with the configuration of an unlicensed UL guard band of guard band configuration 550 (e.g., UL guard band 580-*a*, etc.). The UE may also determine that the configuration of DL guard band 635-*b* is configured with the configuration of a licensed UL guard band of guard band configuration 510 (e.g., UL guard band 535-*b*, etc.).

A UE receiving direction bitmap 650 and availability bitmap 660 may determine that a third bit of the direction bitmap 650 (e.g., binary 0) indicates a third resource block set (e.g., UL resource block set 630-*c*) is in the uplink direction and that the third bit of the availability bitmap 660 (e.g., binary 1) indicates the third resource block set is available Accordingly, the UE may determine that the configuration of UL guard band 640-*b* is configured with the configuration of a licensed DL guard band of guard band configuration 505 (e.g., DL guard band 525-*b*).

A UE receiving direction bitmap 650 and availability bitmap 660 may determine that a fourth bit of the direction bitmap 650 (e.g., binary 1) indicates a fourth resource block set (e.g., DL resource block set 630-*d*) is in the downlink direction and that the fourth bit of the availability bitmap 660 (e.g., binary 1) indicates the fourth resource block set is available. Accordingly, the UE may determine that the configuration of DL guard band 640-*c* is configured with the configuration of a licensed DL guard band of guard band configuration 505 (e.g., DL guard band 525-*c*).

Figure 7:
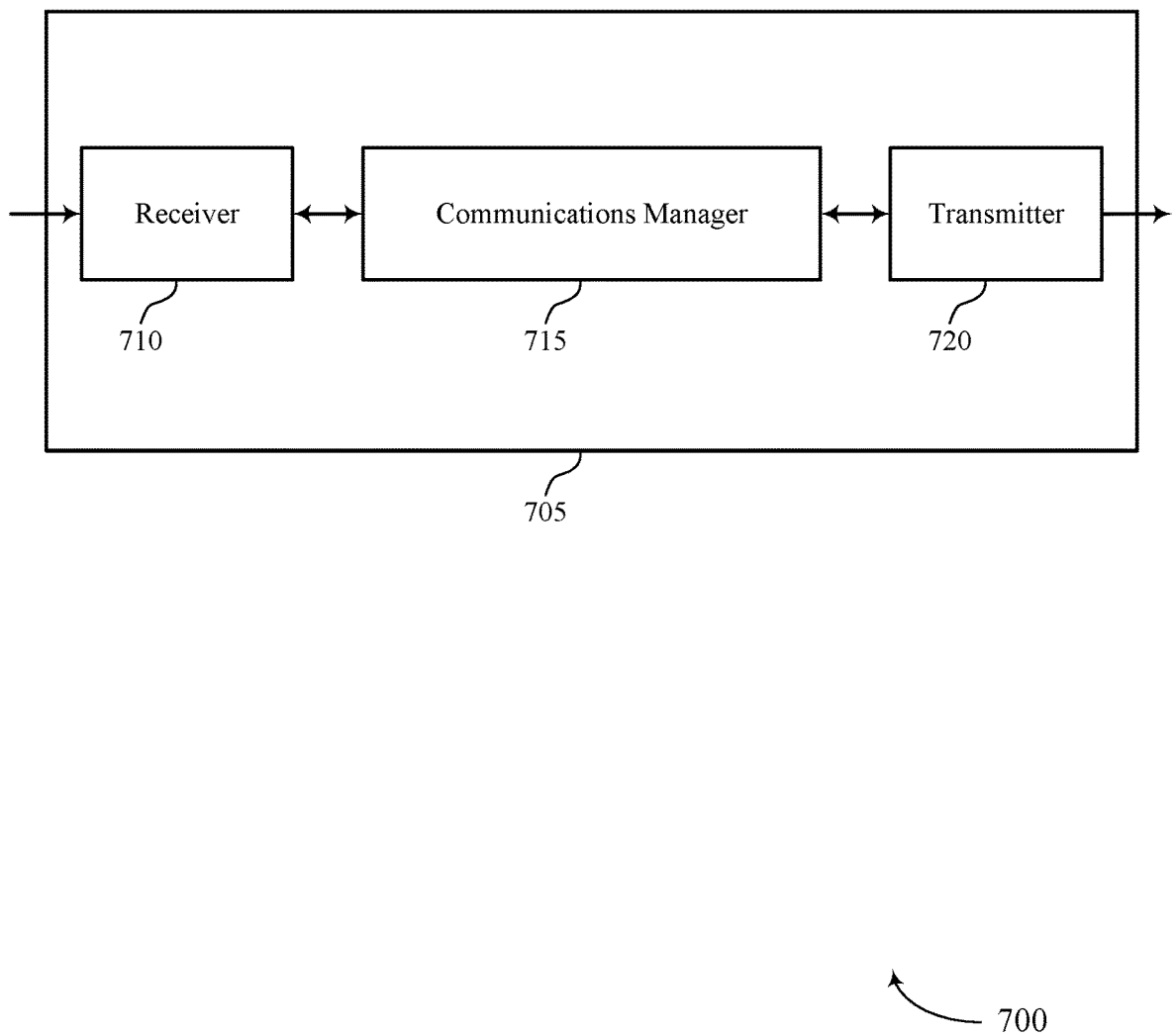
FIGS. 7 and 8 show block diagrams of devices that support resource block set allocation for subband full duplex operation in accordance with aspects of the present disclosure.

FIG. 7 shows a block diagram 700 of a device 705 that supports resource block set allocation for subband full duplex operation in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to resource block set allocation for subband full duplex operation, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify, for the UE, a configuration of a set of resource block sets of a radio frequency spectrum band, receive, from a base station, a downlink control information message indicating, for each resource block set of the set of resource block sets, a communication direction for the resource block set, and communicate with the base station using one or more resource block sets of the set of resource block sets according to one or more communication directions indicated by the received downlink control information message, the one or more communication directions corresponding to respective ones of the one or more resource block sets. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
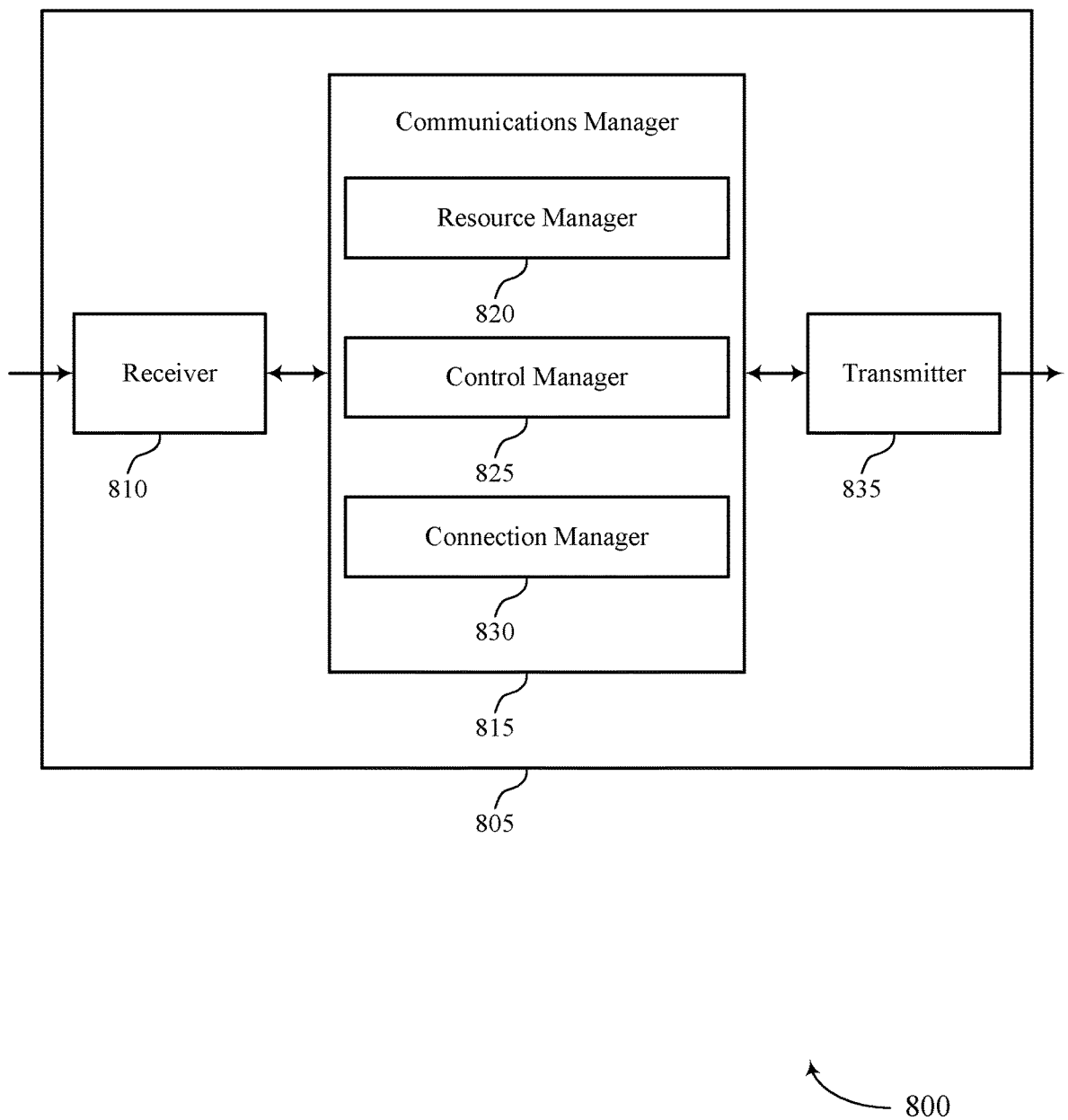

FIG. 8 shows a block diagram 800 of a device 805 that supports resource block set allocation for subband full duplex operation in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to resource block set allocation for subband full duplex operation, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a resource manager 820, a control manager 825, and a connection manager 830. The communications manager 815 may be an example of aspects of the communications manager 1010 described herein.

The resource manager 820 may identify, for the UE, a configuration of a set of resource block sets of a radio frequency spectrum band.

The control manager 825 may receive, from a base station, a downlink control information message indicating, for each resource block set of the set of resource block sets, a communication direction for the resource block set.

The connection manager 830 may communicate with the base station using one or more resource block sets of the set of resource block sets according to one or more communication directions indicated by the received downlink control information message, the one or more communication directions corresponding to respective ones of the one or more resource block sets.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
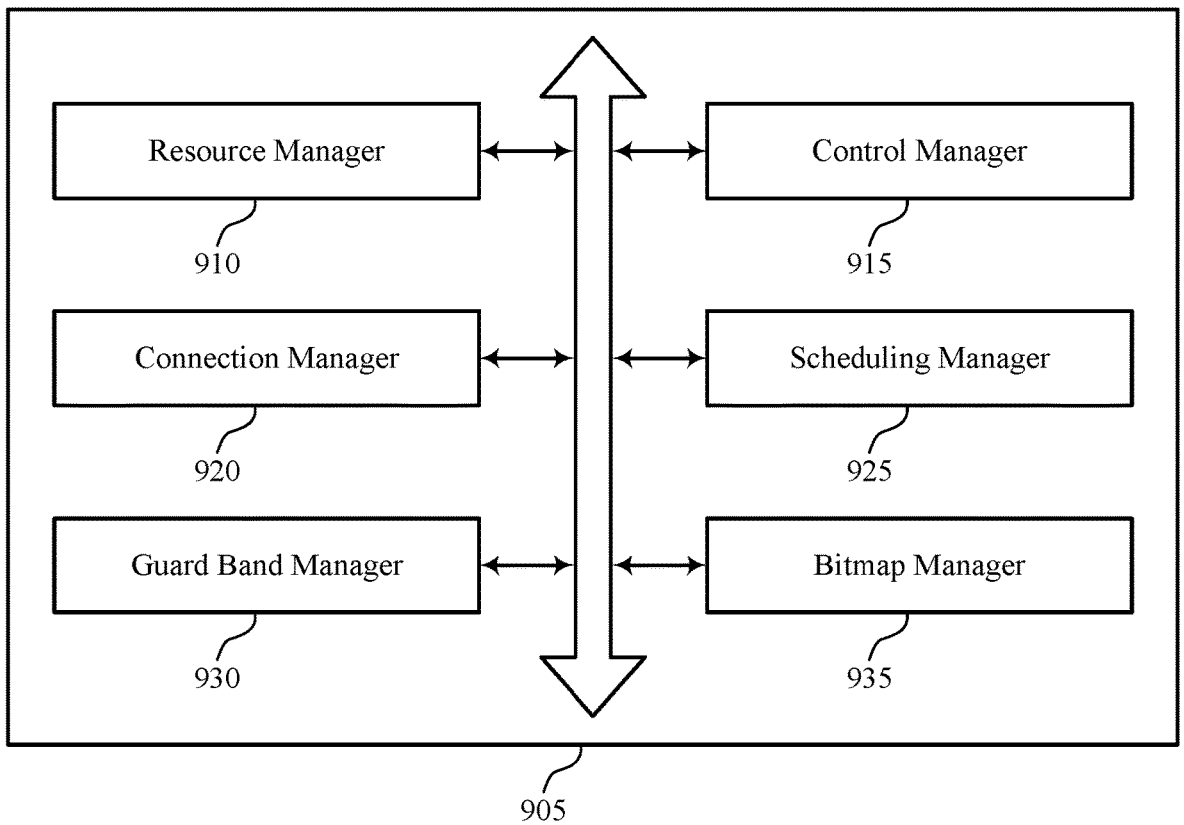
FIG. 9 shows a block diagram of a communications manager that supports resource block set allocation for subband full duplex operation in accordance with aspects of the present disclosure.

FIG. 9 shows a block diagram 900 of a communications manager 905 that supports resource block set allocation for subband full duplex operation in accordance with aspects of the present disclosure. The communications manager 905 may be an example of aspects of a communications manager 715, a communications manager 815, or a communications manager 1010 described herein. The communications manager 905 may include a resource manager 910, a control manager 915, a connection manager 920, a scheduling manager 925, a guard band manager 930, and a bitmap manager 935. Each of these modules may communicate, directly or indirectly, with one another (e.g., via one or more buses).

The resource manager 910 may identify, for the UE, a configuration of a set of resource block sets of a radio frequency spectrum band. In some cases, each resource block set of the set of resource block sets is included within a listen before talk bandwidth. In some cases, each listen before talk bandwidth is a bandwidth part.

The control manager 915 may receive, from a base station, a downlink control information message indicating, for each resource block set of the set of resource block sets, a communication direction for the resource block set.

The connection manager 920 may communicate with the base station using one or more resource block sets of the set of resource block sets according to one or more communication directions indicated by the received downlink control information message, the one or more communication directions corresponding to respective ones of the one or more resource block sets.

The scheduling manager 925 may determine, for each resource block set of the set of resource block sets, that the resource block set is associated with an uplink scheduling grant or a downlink scheduling assignment based on the received downlink control information.

The guard band manager 930 may determine, according to the received downlink control information, a configuration for one or more guard bands between the set of resource block sets. In some examples, the guard band manager 930 may determine, of the one or more guard bands, a frequency size of the guard band based on the received downlink control information. In some cases, the frequency size of an uplink guard band of the one or more guard bands differs in size from the frequency size of a downlink guard band of the one or more guard bands.

The bitmap manager 935 may receive, in the downlink control information message, a first bitmap indicating the communication direction for the resource block set. In some examples, the bitmap manager 935 may determine a number of guard bands based on a number of bits in the first bitmap.

In some examples, the bitmap manager 935 may determine a number of resource block sets in the set of resource block sets based on the number of bits in the first bitmap or the number of guard bands. In some examples, the bitmap manager 935 may receive, in the downlink control information message, an indication of available resource block sets of the set of resource block sets. In some examples, the bitmap manager 935 may communicate with the base station using the one or more resource block sets of the set of resource block sets according to the one or more communication directions indicated by the received downlink control information and the one or more resource block sets indicated as the available resource block sets by the received downlink control information message.

In some examples, the bitmap manager 935 may identify that the radio frequency spectrum band is a shared radio frequency spectrum band. In some examples, the bitmap manager 935 may determine, for each resource block set of the set of resource block sets, that the resource block set is available or unavailable based on the received indication.

In some cases, the indication of the available resource block sets is indicated in a second bitmap of the downlink control information message. In some cases, the second bitmap is received in a channel occupation time system information that is in the downlink control information message.

Figure 10:
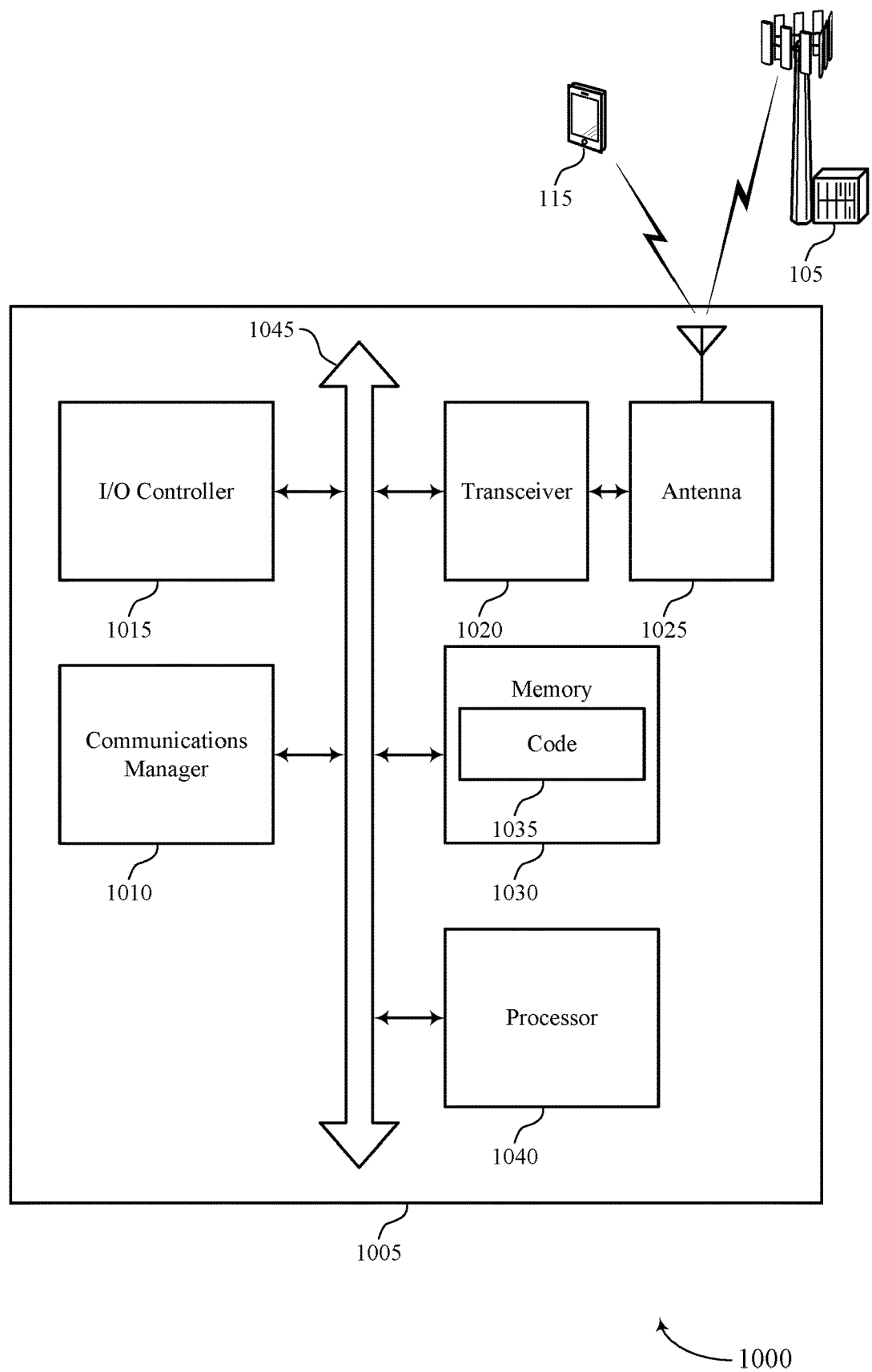
FIG. 10 shows a diagram of a system including a device that supports resource block set allocation for subband full duplex operation in accordance with aspects of the present disclosure.

FIG. 10 shows a diagram of a system 1000 including a device 1005 that supports resource block set allocation for subband full duplex operation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify, for the UE, a configuration of a set of resource block sets of a radio frequency spectrum band, receive, from a base station, a downlink control information message indicating, for each resource block set of the set of resource block sets, a communication direction for the resource block set, and communicate with the base station using one or more resource block sets of the set of resource block sets according to one or more communication directions indicated by the received downlink control information message, the one or more communication directions corresponding to respective ones of the one or more resource block sets.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource block set allocation for subband full duplex operation).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
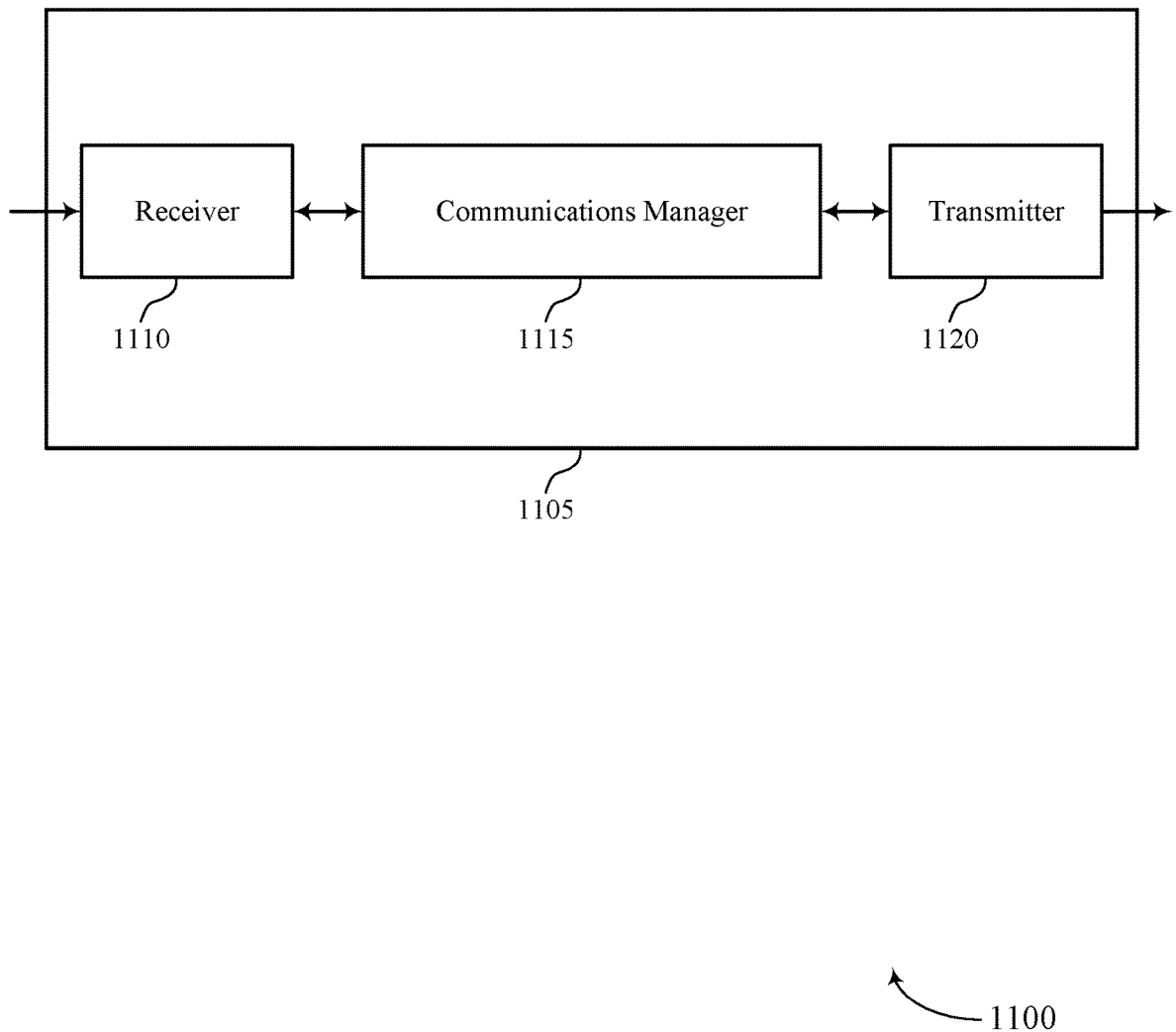
FIGS. 11 and 12 show block diagrams of devices that support resource block set allocation for subband full duplex operation in accordance with aspects of the present disclosure.

FIG. 11 shows a block diagram 1100 of a device 1105 that supports resource block set allocation for subband full duplex operation in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to resource block set allocation for subband full duplex operation, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a configuration of a set of resource block sets of a radio frequency spectrum band, transmit, to a UE, a downlink control information message indicating, for each resource block set of the set of resource block sets, a communication direction for the resource block set, and communicate with the UE using one or more resource block sets of the set of resource block sets according to one or more communication directions indicated by the received downlink control information message, the one or more communication directions corresponding to respective ones of the one or more resource block sets. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
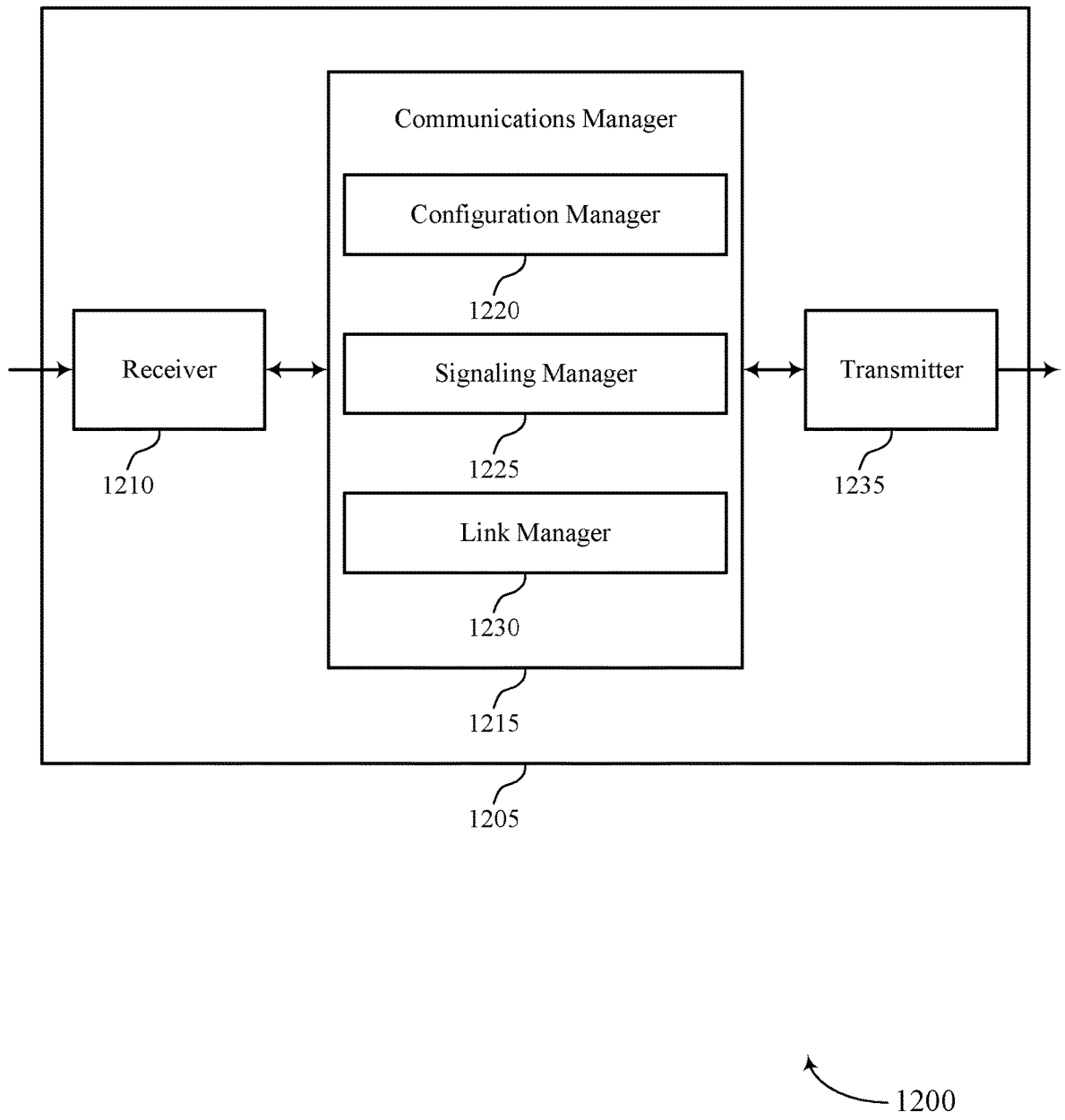

FIG. 12 shows a block diagram 1200 of a device 1205 that supports resource block set allocation for subband full duplex operation in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to resource block set allocation for subband full duplex operation, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220, a signaling manager 1225, and a link manager 1230. The communications manager 1215 may be an example of aspects of the communications manager 1410 described herein.

The configuration manager 1220 may determine a configuration of a set of resource block sets of a radio frequency spectrum band.

The signaling manager 1225 may transmit, to a UE, a downlink control information message indicating, for each resource block set of the set of resource block sets, a communication direction for the resource block set.

The link manager 1230 may communicate with the UE using one or more resource block sets of the set of resource block sets according to one or more communication directions indicated by the received downlink control information message, the one or more communication directions corresponding to respective ones of the one or more resource block sets.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
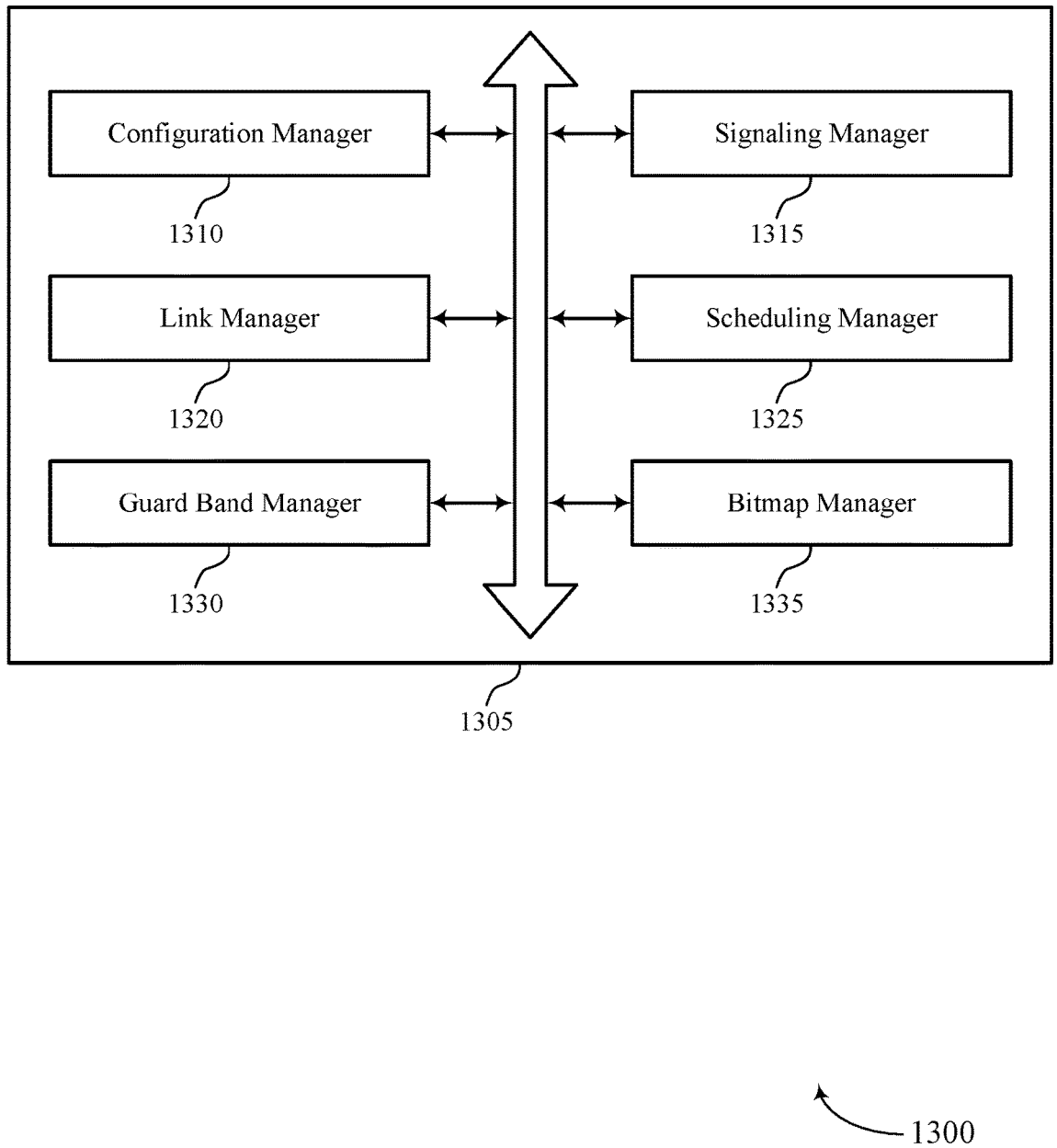
FIG. 13 shows a block diagram of a communications manager that supports resource block set allocation for subband full duplex operation in accordance with aspects of the present disclosure.

FIG. 13 shows a block diagram 1300 of a communications manager 1305 that supports resource block set allocation for subband full duplex operation in accordance with aspects of the present disclosure. The communications manager 1305 may be an example of aspects of a communications manager 1115, a communications manager 1215, or a communications manager 1410 described herein. The communications manager 1305 may include a configuration manager 1310, a signaling manager 1315, a link manager 1320, a scheduling manager 1325, a guard band manager 1330, and a bitmap manager 1335. Each of these modules may communicate, directly or indirectly, with one another (e.g., via one or more buses).

The configuration manager 1310 may determine a configuration of a set of resource block sets of a radio frequency spectrum band. In some cases, each resource block set of the set of resource block sets is included within a listen before talk bandwidth. In some cases, each listen before talk bandwidth is a bandwidth part.

The signaling manager 1315 may transmit, to a UE, a downlink control information message indicating, for each resource block set of the set of resource block sets, a communication direction for the resource block set.

The link manager 1320 may communicate with the UE using one or more resource block sets of the set of resource block sets according to one or more communication directions indicated by the received downlink control information message, the one or more communication directions corresponding to respective ones of the one or more resource block sets. For each resource block set of the set of resource block sets, the resource block set may be associated with an uplink scheduling grant or a downlink scheduling assignment as indicated in the transmitted downlink control information.

The guard band manager 1330 may generate, as indicated in the transmitted downlink control information, a configuration for one or more guard bands between the set of resource block sets. In some examples, the guard band manager 1330 may configure, of the one or more guard bands, a frequency size of the guard band based on the transmitted downlink control information. In some cases, the frequency size of an uplink guard band of the one or more guard bands differs in size from the frequency size of a downlink guard band of the one or more guard bands.

The bitmap manager 1335 may transmit, in the downlink control information message, a first bitmap indicating the communication direction for the resource block set. In some examples, the bitmap manager 1335 may configure a quantity of bits in the first bitmap to indicate a quantity of guard bands between the set of resource block sets, where the quantity of bits in the first bitmap or the quantity of guard bands, or both, indicate a quantity of resource block sets in the set of resource block sets. In some examples, the bitmap manager 1335 may transmit, in the downlink control information message, an indication of available resource block sets of the set of resource block sets.

In some examples, the bitmap manager 1335 may communicate with the UE using the one or more resource block sets of the set of resource block sets according to the one or more communication directions indicated by the transmitted downlink control information and the one or more resource block sets indicated as the available resource block sets by the transmitted downlink control information message.

In some examples, the bitmap manager 1335 may transmit the second bitmap in a channel occupation time system information that is in the downlink control information message. In some examples, the bitmap manager 1335 may identify that the radio frequency spectrum band is a shared radio frequency spectrum band.

In some examples, the bitmap manager 1335 may determine, for each resource block set of the set of resource block sets, that the resource block set is available or unavailable based on the transmitted indication. In some cases, the indication of the available resource block sets is indicated in a second bitmap of the downlink control information message.

Figure 14:
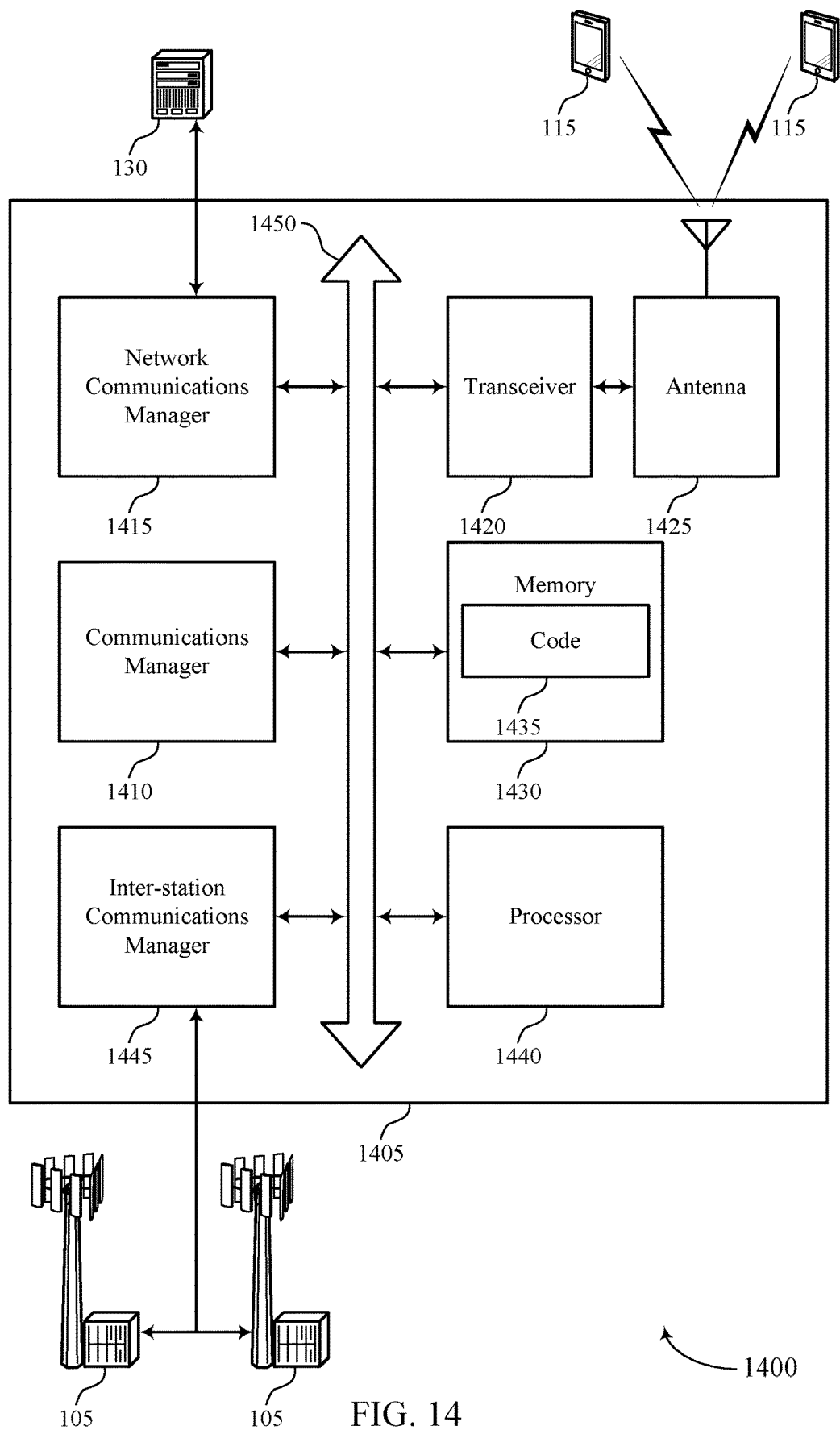
FIG. 14 shows a diagram of a system including a device that supports resource block set allocation for subband full duplex operation in accordance with aspects of the present disclosure.

FIG. 14 shows a diagram of a system 1400 including a device 1405 that supports resource block set allocation for subband full duplex operation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a configuration of a set of resource block sets of a radio frequency spectrum band, transmit, to a UE, a downlink control information message indicating, for each resource block set of the set of resource block sets, a communication direction for the resource block set, and communicate with the UE using one or more resource block sets of the set of resource block sets according to one or more communication directions indicated by the received downlink control information message, the one or more communication directions corresponding to respective ones of the one or more resource block sets.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting resource block set allocation for subband full duplex operation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
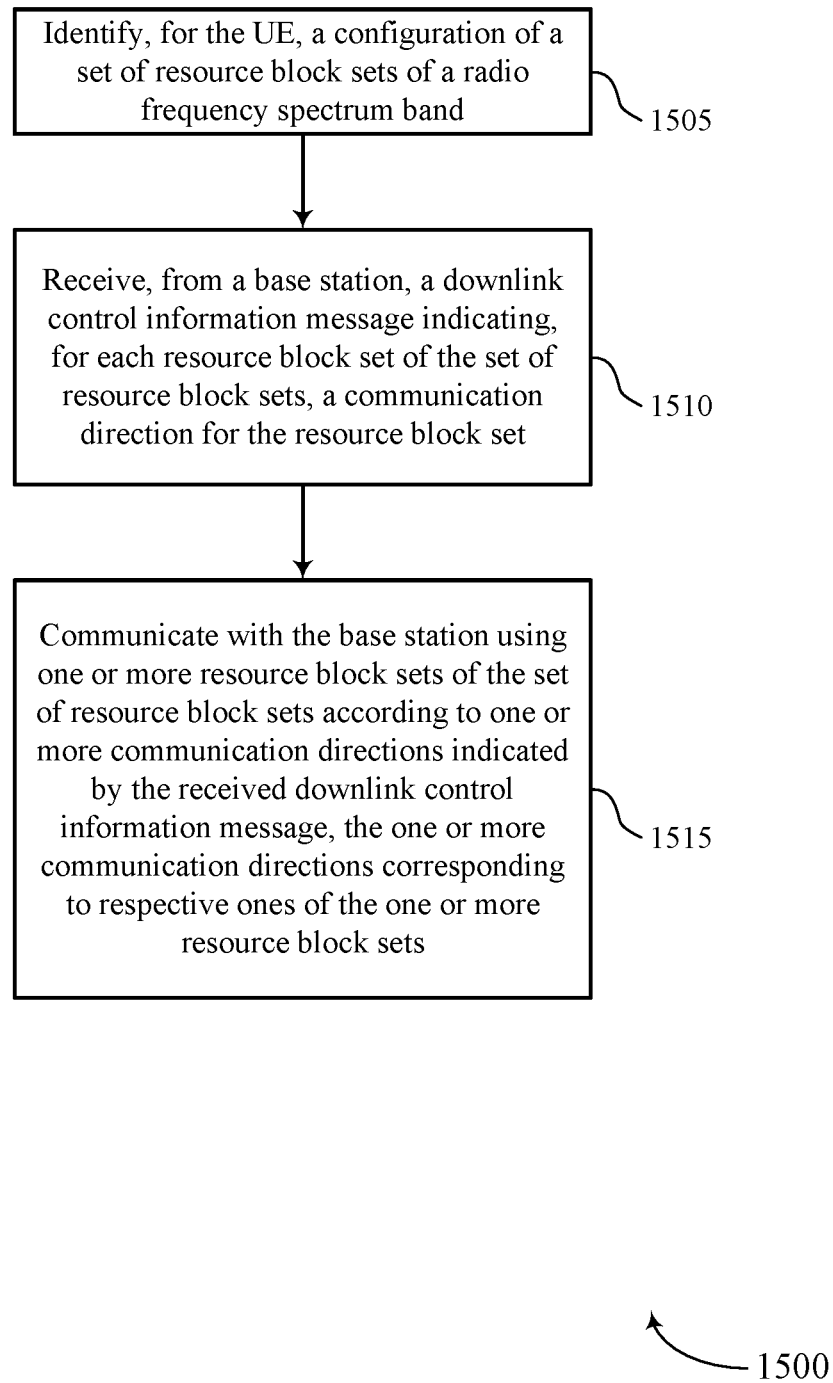
FIGS. 15 through 18 show flowcharts illustrating methods that support resource block set allocation for subband full duplex operation in accordance with aspects of the present disclosure.

FIG. 15 shows a flowchart illustrating a method 1500 that supports resource block set allocation for subband full duplex operation in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify, for the UE, a configuration of a set of resource block sets of a radio frequency spectrum band. The operations of 1505 may be performed according to the methods described herein. In some examples, aspects of the operations of 1505 may be performed by a resource manager as described with reference to FIGS. 7 through 10.

At 1510, the UE may receive, from a base station, a downlink control information message indicating, for each resource block set of the set of resource block sets, a communication direction for the resource block set. The operations of 1510 may be performed according to the methods described herein. In some examples, aspects of the operations of 1510 may be performed by a control manager as described with reference to FIGS. 7 through 10.

At 1515, the UE may communicate with the base station using one or more resource block sets of the set of resource block sets according to one or more communication directions indicated by the received downlink control information message, the one or more communication directions corresponding to respective ones of the one or more resource block sets. The operations of 1515 may be performed according to the methods described herein. In some examples, aspects of the operations of 1515 may be performed by a connection manager as described with reference to FIGS. 7 through 10.

Figure 16:
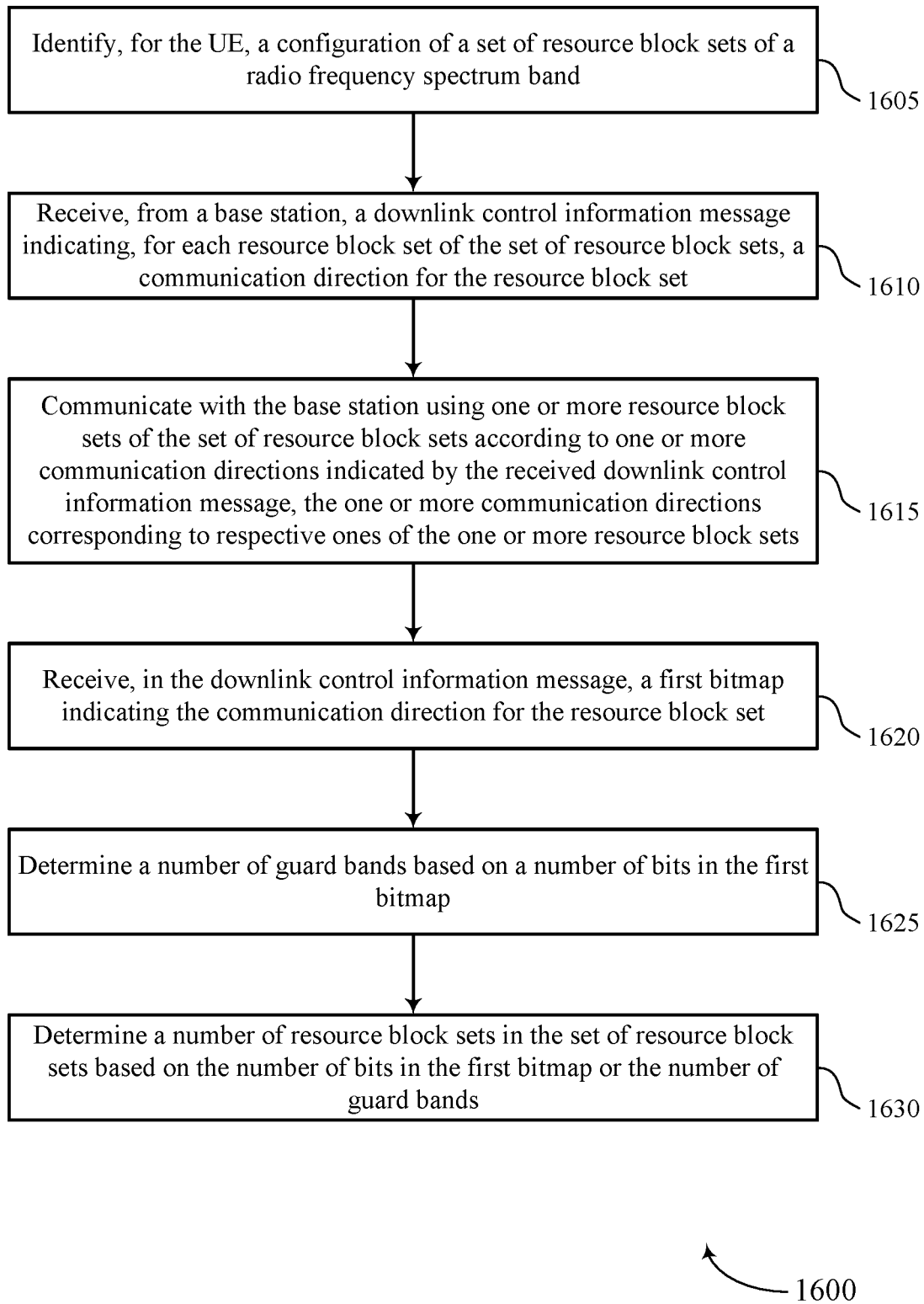

FIG. 16 shows a flowchart illustrating a method 1600 that supports resource block set allocation for subband full duplex operation in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify, for the UE, a configuration of a set of resource block sets of a radio frequency spectrum band. The operations of 1605 may be performed according to the methods described herein. In some examples, aspects of the operations of 1605 may be performed by a resource manager as described with reference to FIGS. 7 through 10.

At 1610, the UE may receive, from a base station, a downlink control information message indicating, for each resource block set of the set of resource block sets, a communication direction for the resource block set. The operations of 1610 may be performed according to the methods described herein. In some examples, aspects of the operations of 1610 may be performed by a control manager as described with reference to FIGS. 7 through 10.

At 1615, the UE may communicate with the base station using one or more resource block sets of the set of resource block sets according to one or more communication directions indicated by the received downlink control information message, the one or more communication directions corresponding to respective ones of the one or more resource block sets. The operations of 1615 may be performed according to the methods described herein. In some examples, aspects of the operations of 1615 may be performed by a connection manager as described with reference to FIGS. 7 through 10.

At 1620, the UE may receive, in the downlink control information message, a first bitmap indicating the communication direction for the resource block set. The operations of 1620 may be performed according to the methods described herein. In some examples, aspects of the operations of 1620 may be performed by a bitmap manager as described with reference to FIGS. 7 through 10.

At 1625, the UE may determine a number of guard bands based on a number of bits in the first bitmap. The operations of 1625 may be performed according to the methods described herein. In some examples, aspects of the operations of 1625 may be performed by a bitmap manager as described with reference to FIGS. 7 through 10.

At 1630, the UE may determine a number of resource block sets in the set of resource block sets based on the number of bits in the first bitmap or the number of guard bands. The operations of 1630 may be performed according to the methods described herein. In some examples, aspects of the operations of 1630 may be performed by a bitmap manager as described with reference to FIGS. 7 through 10.

Figure 17:
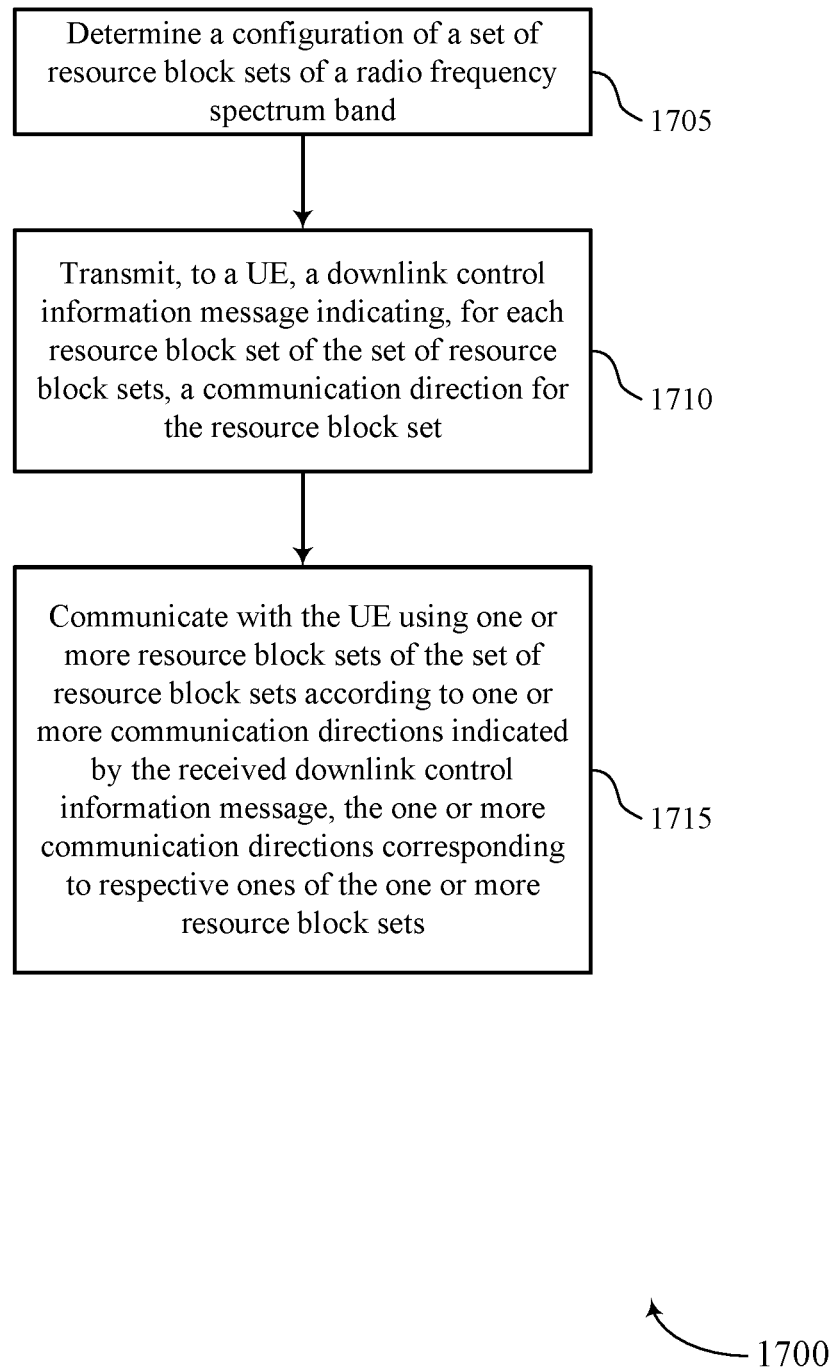

FIG. 17 shows a flowchart illustrating a method 1700 that supports resource block set allocation for subband full duplex operation in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may determine a configuration of a set of resource block sets of a radio frequency spectrum band. The operations of 1705 may be performed according to the methods described herein. In some examples, aspects of the operations of 1705 may be performed by a configuration manager as described with reference to FIGS. 11 through 14.

At 1710, the base station may transmit, to a UE, a downlink control information message indicating, for each resource block set of the set of resource block sets, a communication direction for the resource block set. The operations of 1710 may be performed according to the methods described herein. In some examples, aspects of the operations of 1710 may be performed by a signaling manager as described with reference to FIGS. 11 through 14.

At 1715, the base station may communicate with the UE using one or more resource block sets of the set of resource block sets according to one or more communication directions indicated by the received downlink control information message, the one or more communication directions corresponding to respective ones of the one or more resource block sets. The operations of 1715 may be performed according to the methods described herein. In some examples, aspects of the operations of 1715 may be performed by a link manager as described with reference to FIGS. 11 through 14.

Figure 18:
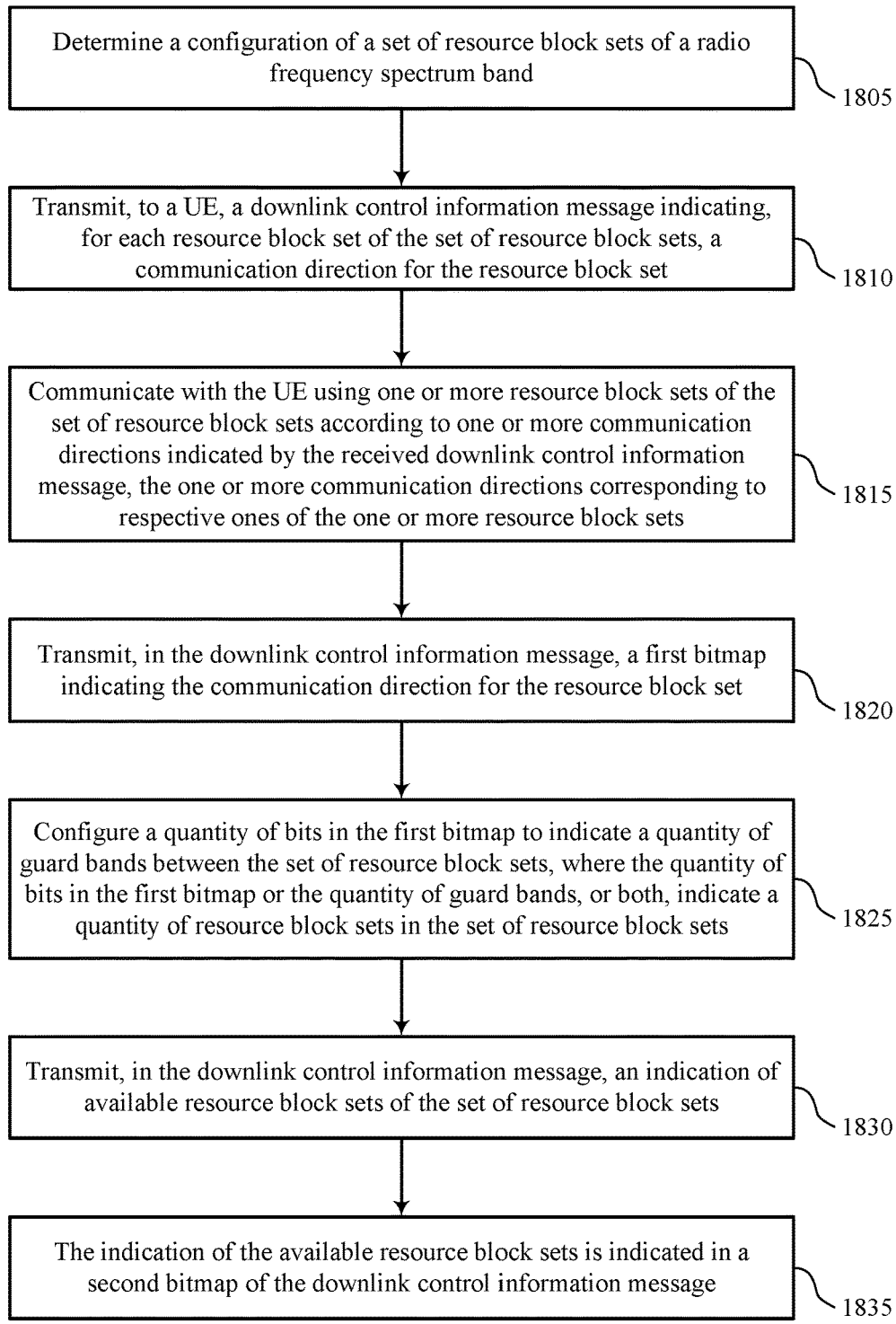

FIG. 18 shows a flowchart illustrating a method 1800 that supports resource block set allocation for subband full duplex operation in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine a configuration of a set of resource block sets of a radio frequency spectrum band. The operations of 1805 may be performed according to the methods described herein. In some examples, aspects of the operations of 1805 may be performed by a configuration manager as described with reference to FIGS. 11 through 14.

At 1810, the base station may transmit, to a UE, a downlink control information message indicating, for each resource block set of the set of resource block sets, a communication direction for the resource block set. The operations of 1810 may be performed according to the methods described herein. In some examples, aspects of the operations of 1810 may be performed by a signaling manager as described with reference to FIGS. 11 through 14.

At 1815, the base station may communicate with the UE using one or more resource block sets of the set of resource block sets according to one or more communication directions indicated by the received downlink control information message, the one or more communication directions corresponding to respective ones of the one or more resource block sets. The operations of 1815 may be performed according to the methods described herein. In some examples, aspects of the operations of 1815 may be performed by a link manager as described with reference to FIGS. 11 through 14.

At 1820, the base station may transmit, in the downlink control information message, a first bitmap indicating the communication direction for the resource block set. The operations of 1820 may be performed according to the methods described herein. In some examples, aspects of the operations of 1820 may be performed by a bitmap manager as described with reference to FIGS. 11 through 14.

At 1825, the base station may configure a quantity of bits in the first bitmap to indicate a quantity of guard bands between the set of resource block sets, where the quantity of bits in the first bitmap or the quantity of guard bands, or both, indicate a quantity of resource block sets in the set of resource block sets. The operations of 1825 may be performed according to the methods described herein. In some examples, aspects of the operations of 1825 may be performed by a bitmap manager as described with reference to FIGS. 11 through 14.

At 1830, the base station may transmit, in the downlink control information message, an indication of available resource block sets of the set of resource block sets. The operations of 1830 may be performed according to the methods described herein. In some examples, aspects of the operations of 1830 may be performed by a bitmap manager as described with reference to FIGS. 11 through 14.

At 1835, the base station may the indication of the available resource block sets is indicated in a second bitmap of the downlink control information message. The operations of 1835 may be performed according to the methods described herein. In some examples, aspects of the operations of 1835 may be performed by a bitmap manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying, for the UE, a configuration of a plurality of resource block sets of a radio frequency spectrum band;
   receiving, from a base station, a downlink control information message indicating, for each resource block set of the plurality of resource block sets, a communication direction for the resource block set; and
   communicating with the base station using one or more resource block sets of the plurality of resource block sets according to one or more communication directions indicated by the received downlink control information message, the one or more communication directions corresponding to respective ones of the one or more resource block sets.

2. The method of claim 1, further comprising:
   determining, for each resource block set of the plurality of resource block sets, that the resource block set is associated with an uplink scheduling grant or a downlink scheduling assignment based at least in part on the received downlink control information.

3. The method of claim 1, further comprising:
   determining, according to the received downlink control information, a configuration for one or more guard bands between the plurality of resource block sets.

4. The method of claim 3, wherein determining the configuration for the one or more guard bands comprises:
   determining, of the one or more guard bands, a frequency size of a guard band based at least in part on the received downlink control information.

5. The method of claim 1, wherein indicating the communication direction for each resource block set of the plurality of resource block sets further comprises:
   receiving, in the downlink control information message, a first bitmap indicating the communication direction for the resource block set.

6. The method of claim 5, further comprising:
   determining a number of guard bands based at least in part on a number of bits in the first bitmap; and
   determining a number of resource block sets in the plurality of resource block sets based at least in part on the number of bits in the first bitmap or the number of guard bands.

7. The method of claim 1, further comprising:
   receiving, in the downlink control information message, an indication of available resource block sets of the plurality of resource block sets.

8. The method of claim 1, wherein each resource block set of the plurality of resource block sets is comprised within a listen before talk bandwidth.

9. A method for wireless communications at a base station, comprising:
   determining a configuration of a plurality of resource block sets of a radio frequency spectrum band;
   transmitting, to a user equipment (UE), a downlink control information message indicating, for each resource block set of the plurality of resource block sets, a communication direction for the resource block set; and communicating with the UE using one or more resource block sets of the plurality of resource block sets according to one or more communication directions indicated by the transmitted downlink control information message, the one or more communication directions corresponding to respective ones of the one or more resource block sets.

10. The method of claim 9, wherein, for each resource block set of the plurality of resource block sets, the resource block set is associated with an uplink scheduling grant or a downlink scheduling assignment as indicated in the transmitted downlink control information.

11. The method of claim 9, further comprising:
generating, as indicated in the transmitted downlink control information, a configuration for one or more guard bands between the plurality of resource block sets.

12. The method of claim 11, wherein determining the configuration for the one or more guard bands comprises:
configuring, of the one or more guard bands, a frequency size of a guard band based at least in part on the transmitted downlink control information.

13. The method of claim 9, wherein indicating the communication direction for each resource block set of the plurality of resource block sets further comprises:
transmitting, in the downlink control information message, a first bitmap indicating the communication direction for the resource block set.

14. The method of claim 9, further comprising:
transmitting, in the downlink control information message, an indication of available resource block sets of the plurality of resource block sets.

15. The method of claim 9, wherein each resource block set of the plurality of resource block sets is comprised within a listen before talk bandwidth.

16. An apparatus for wireless communications at a user equipment (UE), comprising:
one or more processors,
one or more memories coupled with the one or more processors; and
instructions stored in the one or more memories and executable by the one or more processors to cause the apparatus to:
identify, for the UE, a configuration of a plurality of resource block sets of a radio frequency spectrum band;
receive, from a base station, a downlink control information message indicating, for each resource block set of the plurality of resource block sets, a communication direction for the resource block set; and
communicate with the base station using one or more resource block sets of the plurality of resource block sets according to one or more communication directions indicated by the received downlink control information message, the one or more communication directions corresponding to respective ones of the one or more resource block sets.

17. The apparatus of claim 16, wherein the instructions are further executable by the one or more processors to cause the apparatus to:
determine, for each resource block set of the plurality of resource block sets, that the resource block set is associated with an uplink scheduling grant or a downlink scheduling assignment based at least in part on the received downlink control information.

18. The apparatus of claim 16, wherein the instructions are further executable by the one or more processors to cause the apparatus to:
determine, according to the received downlink control information, a configuration for one or more guard bands between the plurality of resource block sets.

19. The apparatus of claim 16, wherein the instructions to indicate the communication direction for each resource block set of the plurality of resource block sets further are executable by the one or more processors to cause the apparatus to:
receive, in the downlink control information message, a first bitmap indicating the communication direction for the resource block set.

20. The apparatus of claim 16, wherein the instructions are further executable by the one or more processors to cause the apparatus to:
receive, in the downlink control information message, an indication of available resource block sets of the plurality of resource block sets.

* * * * *